(12) United States Patent  (10) Patent No.: US 7,634,615 B2
Sutardja  (45) Date of Patent: Dec. 15, 2009

(54) ADAPTIVE STORAGE SYSTEM

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 401 days.

(21) Appl. No.: 10/865,368

(22) Filed: Jun. 10, 2004

(65) Prior Publication Data

US 2005/0289361 A1  Dec. 29, 2005

(51) Int. Cl.
G06F 12/00  (2006.01)
G06F 13/00  (2006.01)

(52) U.S. Cl. .................. 711/112; 711/100; 711/114; 711/133; 711/154

(58) Field of Classification Search .............. 711/112, 711/165, 154, 133, 118, 100; 365/185.33, 365/226, 227
See application file for complete search history.

(56) References Cited

U.S. PATENT DOCUMENTS

| | | | |
|---|---|---|---|
| 4,425,615 A * | 1/1984 | Swenson et al. ............ 711/114 |
| 5,150,465 A | 9/1992 | Bush et al. | |
| 5,455,913 A | 10/1995 | Shrock et al. | |
| 5,485,595 A * | 1/1996 | Assar et al. ................. 711/103 |
| 5,596,708 A | 1/1997 | Weber | |
| 5,659,718 A * | 8/1997 | Osman et al. ............... 713/400 |
| 5,768,164 A | 6/1998 | Hollon, Jr. | |
| 5,809,336 A | 9/1998 | Moore et al. | |
| 5,937,423 A | 8/1999 | Robinson | |
| 6,035,408 A | 3/2000 | Huang et al. | |
| 6,122,720 A * | 9/2000 | Cliff ............................ 712/15 |
| 6,282,614 B1 | 8/2001 | Musoll | |
| 6,457,135 B1 | 9/2002 | Cooper | |
| 6,496,915 B1 | 12/2002 | Halleck | |
| 6,501,999 B1 | 12/2002 | Cai | |
| 6,578,129 B1 * | 6/2003 | da Silva, Jr. et al. ........ 711/209 |
| 6,594,724 B1 | 7/2003 | Smith | |
| 6,598,148 B1 | 7/2003 | Moore et al. | |
| 6,628,469 B1 * | 9/2003 | Hoyt ............................. 360/69 |
| 6,631,469 B1 | 10/2003 | Silvester | |
| 6,631,474 B1 | 10/2003 | Cai et al. | |
| 6,639,827 B2 | 10/2003 | Clark et al. | |
| 6,725,336 B2 | 4/2004 | Cherabuddi | |
| 6,763,480 B2 | 7/2004 | Harari et al. | |
| 6,775,180 B2 | 8/2004 | Biyani et al. | |
| 6,859,856 B2 | 2/2005 | Piau et al. | |
| 7,069,388 B1 | 6/2006 | Greenfield et al. | |
| 2002/0083264 A1 | 6/2002 | Coulson | |
| 2002/0124196 A1 | 9/2002 | Morrow et al. | |
| 2002/0129288 A1 | 9/2002 | Loh et al. | |

(Continued)

FOREIGN PATENT DOCUMENTS

CN  1 550 951  12/2004

(Continued)

OTHER PUBLICATIONS

U.S. Application Entitled "Low Power Computer With Main and Auxiliary Processors", filed Jun. 10, 2004.

(Continued)

*Primary Examiner*—Tuan V. Thai

(57) ABSTRACT

Various types of data storage systems employ low power disk drives to cache data to/from high power disk drives to reduce power consumption and access times.

169 Claims, 31 Drawing Sheets

U.S. PATENT DOCUMENTS

| | | | |
|---|---|---|---|
| 2003/0100963 | A1 | 5/2003 | Potts et al. |
| 2003/0135771 | A1 | 7/2003 | Cupps et al. |
| 2003/0153354 | A1 | 8/2003 | Cupps et al. |
| 2003/0163666 | A1 | 8/2003 | Cupps et al. |
| 2003/0226044 | A1 | 12/2003 | Cupps et al. |
| 2004/0003168 | A1 | 1/2004 | Kim et al. |
| 2004/0064647 | A1* | 4/2004 | DeWhitt et al. ............ 711/135 |
| 2004/0163004 | A1 | 8/2004 | Kardach et al. |
| 2004/0225901 | A1 | 11/2004 | Bear et al. |
| 2004/0243761 | A1* | 12/2004 | Bohrer et al. ............... 711/114 |
| 2005/0064911 | A1 | 3/2005 | Chen et al. |
| 2005/0066209 | A1 | 3/2005 | Kee et al. |
| 2005/0172074 | A1 | 8/2005 | Sinclair |
| 2005/0278559 | A1 | 12/2005 | Sutardja et al. |
| 2005/0289361 | A1 | 12/2005 | Sutardja |
| 2006/0007051 | A1 | 1/2006 | Bear et al. |
| 2006/0069848 | A1 | 3/2006 | Nalawadi et al. |
| 2006/0075185 | A1 | 4/2006 | Azzarito et al. |
| 2006/0129861 | A1 | 6/2006 | Kee et al. |
| 2006/0277360 | A1 | 12/2006 | Sutardja |
| 2007/0028292 | A1* | 2/2007 | Kabzinski et al. ............. 726/2 |
| 2007/0055841 | A1 | 3/2007 | Jansen et al. |

FOREIGN PATENT DOCUMENTS

| | | |
|---|---|---|
| EP | 0 666 539 A | 8/1995 |
| EP | 0 702 305 A | 3/1996 |
| EP | EP 0 702 305 A | 3/1996 |
| EP | 1 605 453 A2 | 12/2005 |
| EP | 1 605 456 A2 | 12/2005 |
| WO | WO 01/15161 A | 3/2001 |
| WO | WO 2004/090889 | 10/2004 |

OTHER PUBLICATIONS

U.S. Appl. No. 10/779,544, filed Feb. 13, 2004; Entitled "Computer WIth Low-Power Secondary Processor and Secondary Display".
Communication from EPO dated Aug. 31, 2006 transmitting European search report for Application No. 05010676.4-2210; 3 pages.
Communication from EPO dated Aug. 31, 2006 transmitting European search report for Application No. 05010672.3-2210; 3 pages.
Communication from EPO dated Aug. 31, 2006 transmitting European search report for Application No. 05010673.1-2210; 3 pages.
Communication from EPO dated Aug. 31, 2006 transmitting European search report for Application No. 05010671.5-2210; 3 pages.
First Official Communication from the European Patent Office dated May 22, 2007 for Application No. 05 010 671.5—1232; 5 pages.
First Official Communication from the European Patent Office dated May 22, 2007 for Application No. 05 010 673.1—1232; 4 pages.
First Official Communication from the European Patent Office dated May 22, 2007 for Application No. 05 010 672.3—1232; 4 pages.
HDD Photo Storage—Operating Instructions for HDPS-M1 Sony, [Online] Jun. 17, 2004, XP002481634 URL:http://www.manualshark.org/manualshark/files/4/pdf_6738.pdf>.
Notification of Transmittal of the International Search Report and The Written Opinion of The International Searching Authority, or the Declaration dated Jun. 11, 2008 in reference to PCT/US2008/002194.
U.S. Appl. No. 60/820,867, filed Jul. 31, 2006, Sutardja, Sehat et al.
U.S. Appl. No. 60/799,151, filed May 10, 2006, Sutardja, Sehat et al.
U.S. Appl. No. 10/865,732, filed Jun. 10, 2004, Sutardja, Sehat et al.
U.S. Appl. No. 10/779,544, filed Feb. 13, 2004, Sutardja, Sehat et al.
U.S. Appl. No. 10/678,249, filed May 5, 2005, Yang, Yun.
U.S. Appl. No. 10/865,368, filed Jun. 10, 2004, Sutardja, Sehat et al.
U.S. Appl. No. 11/322,447, filed Dec. 29, 2005, Yang, Yun.
Dean Takahashi; "PortalPlayer Takes A Leap", The Mercury News, Mar. 14, 2006, 3 pages.
ANSI/IEEE Std. 802.11, 1999 Edition; Part 11: Wireless LAN Medium Access Cntrol (MAC) and Physical Layer (PHY) Specifications; Information technology—Telecommunications and information exchange between systems—Local and metropolitan area networks—Specific requirements; pp. 1-512.
IEEE P802.11g/D8.2 Apr. 2003 (Supplement to ANSI/IEEE std. 802.11 1999(Reaff 2003)) Draft Supplement Standard for Part 11: Wireless LAN Medium Access Cntrol (MAC) and Physical Layer (PHY) Specifications; Information technology—Telecommunications and information exchange between systems—Local and metropolitan area networks—Specific requirements; Further Higher Data Rate Extension in the 2.4 GHz Band; pp. 1-69.
IEEE Std. 802.11a-1999; Supplement to IEEE Standard for Information Technology—Telecommunications and information exchange between systems—Local and metropolitan area networks—Specific requirements; Part: 11 Wireless LAN Medium Access Control (MAC) and Physical Layer (PHY) specifications; High-speed Physical Layer in the 5 GHz Band; pp. 1-83.
IEEE Std. 802.11b; Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications; Higher-Speed Physical Layer Extension in the 2.4 GHz Band; Approved Sep. 16, 1999; pp. 1-89.
IEEE Std. 802.11b-1999/Cor 1-2001;IEEE Standard for Information technology—Telecommunications and information exchange between systems—Local and metropolitan area networks—Specific requirements; Part 11: Wireless LAN Medium Access Cntrol (MAC) and Physical Layer (PHY) Specifications; Amendment 2: Higher-speed Physical Layer (PHY) extension in the 2.4 GHz band—Corrigendum 1; pp. 1-15.
IEEE Std. 802.16; IEEE Standard for Local and metropolitan area networks; Part 16: Air Interface for Fixed Broadband Wireless Access Systems; Apr. 8, 2002; pp. 1-322.
IEEE Std. 802.16a; IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz; Apr. 1, 2003; pp. 1-292.
CAST, Inc. (Jun. 2004) "NFlashCtrl NAND Flash Memory Controller Megafunction"; 2 pages.
CAST, Inc., "NFlashCtrl NAND Flash Memory Controller Core"; http://ww.cast-inc.com/cores/nflashcntl/index.shtml—Jul. 29, 2005; 3 pages.
Cirrus Logic; CL-SH7660 Prelinary Product Bulletin; "Advanced Architecture ATA Disk Controller"; Sep. 1998; 4 pages.
Electronics Press World, "Power Digital Card (PDC) and Samsung Strikes Again As An Industry First to Release the 128MegaByte Reduced Size MultiMediaCards," http://electronics.press-world.com/v/48895/power-ditigal-card-pdc-and-samsung-strikes-again-as-an-idust...; Jul. 7, 2003 3 pages.
Press Release from GD Technik; Flash Memory Module Thinks It's a Hard Disk; http//www.electronicstalk.com/news/gdt/gdt17.html; Apr. 25, 2005; 2 pages.
Hachman, M., "Samsung: 'Hybrid' Hard Drives Will Ship in 2006," http://www.extremetech.com/article2/0, 1558, 1789189,00.asp, Apr. 25, 2005; 2 pages.
Pretec Electronics Corp.; Mini IDE (MIDE) Flash Drive; http://www.pretec.com/product/SSD/Industrial/miniide.htm; 2005; 4 pages.
2002 Silicon Storage Technology, Inc.; "ATA Flash Disk Controller" SST55LDo17A/SST55LD017B/SST55LD017C; Preliminary Specifications; 2002; 52 pages.
U.S. Appl. No. 60/822,015, filed Aug. 2006, Sutardja.
U.S. Appl. No. 60/823,453, filed Aug. 2006, Sutardja.
U.S. Appl. No. 60/825,368, filed Sep. 2006, Sutardja.
U.S. Appl. No. 60/890,684, filed Feb. 2007, Sutardja et al.
First Office Action from the State Intellectual Property Office of PRC dated Nov. 2, 2007 for Application No. 200510077194.6; 17 pages.
First Office Action from the State Intellectual Property Office of PRC dated Nov. 2, 2007 for Application No. 200510070913.1; 19 pages.
First Office Action from the State Intellectual Property Office of PRC dated Nov. 2, 2007 for Application No. 200510077196.5; 18 pages.
First Office Action from the State Intellectual Property Office of PRC dated Oct. 12, 2007 for Application No. 200510077195.0; 7 pages.

PCT International Search Report and Written Opinion; Dec. 20, 2007; for International Application No. PCT/US2007/011326; 13 pages.

PCT International Search Report and Written Opinion; Jan. 28, 2008; for International Application No. PCT/US2007/011328; 7 pages.

Wikipedia; "CompactFlash"; http://web.archive.org/web/20060109003035/http://en.wikipedia.org/wiki/CompactFlash_II; Jan. 9, 2006; 4 pages.

* cited by examiner

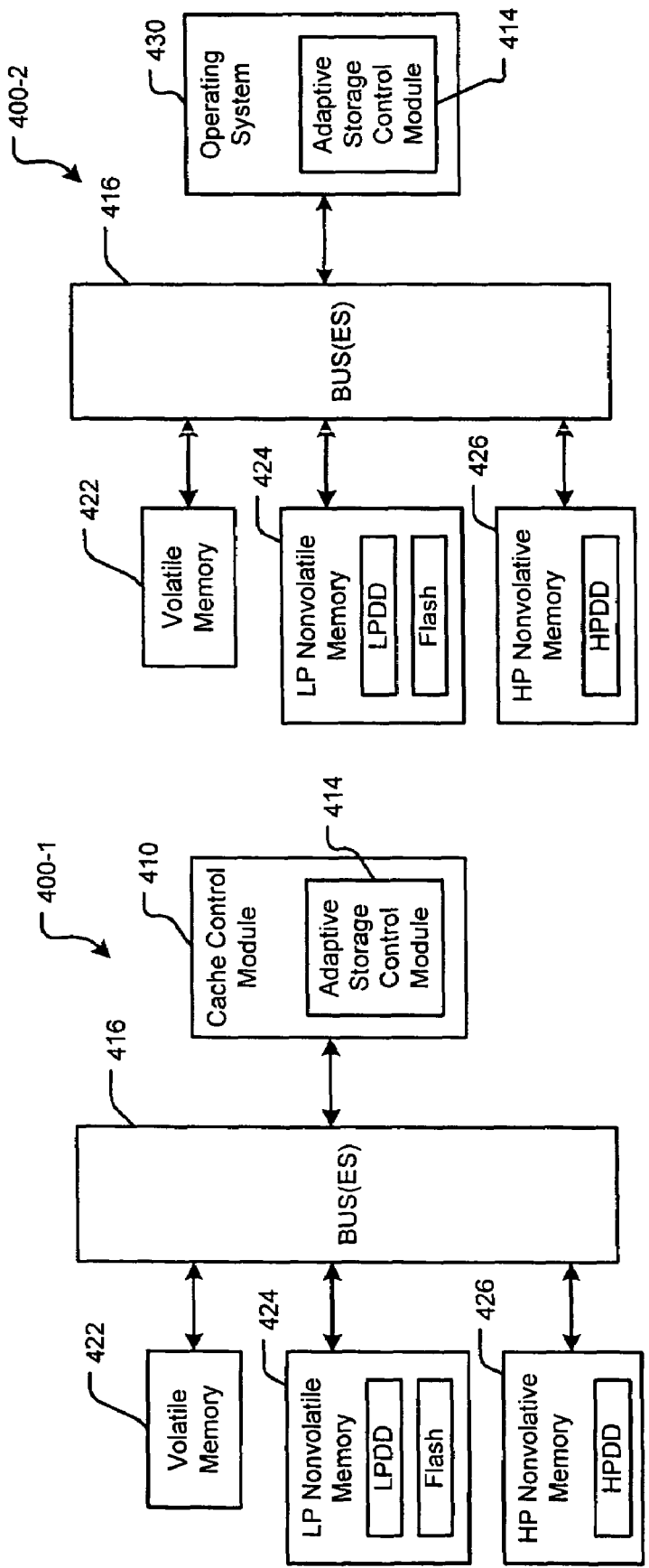

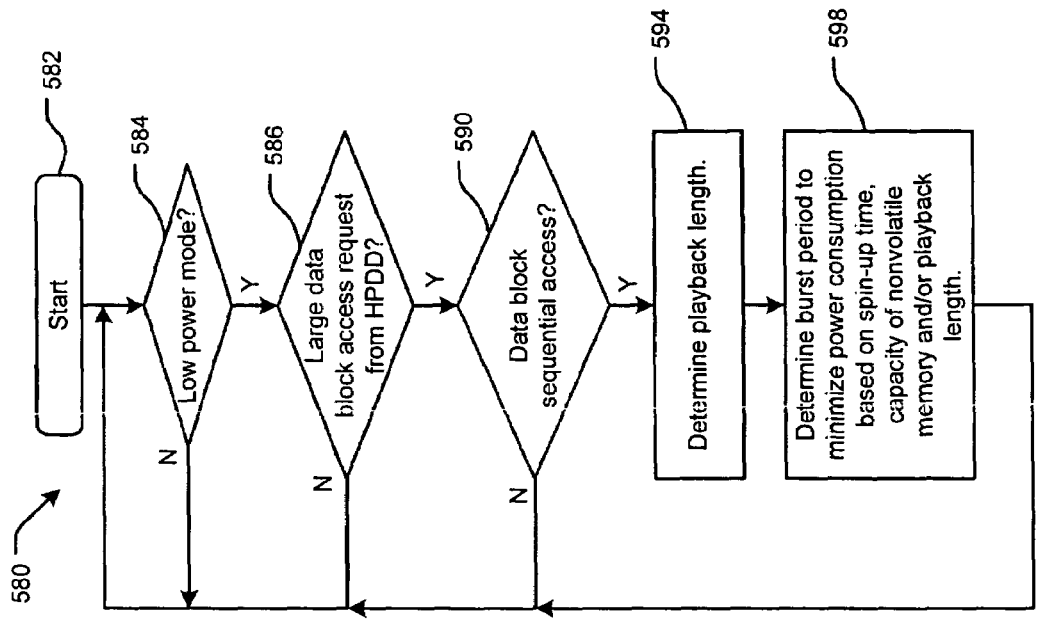

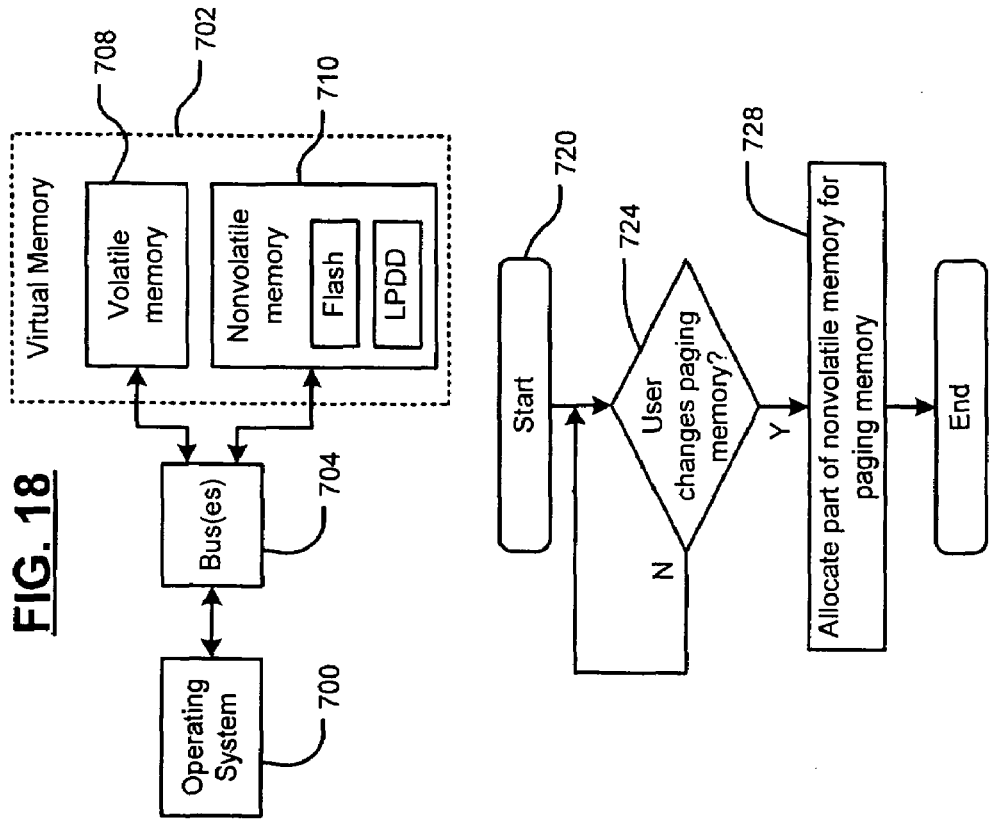
FIG. 20
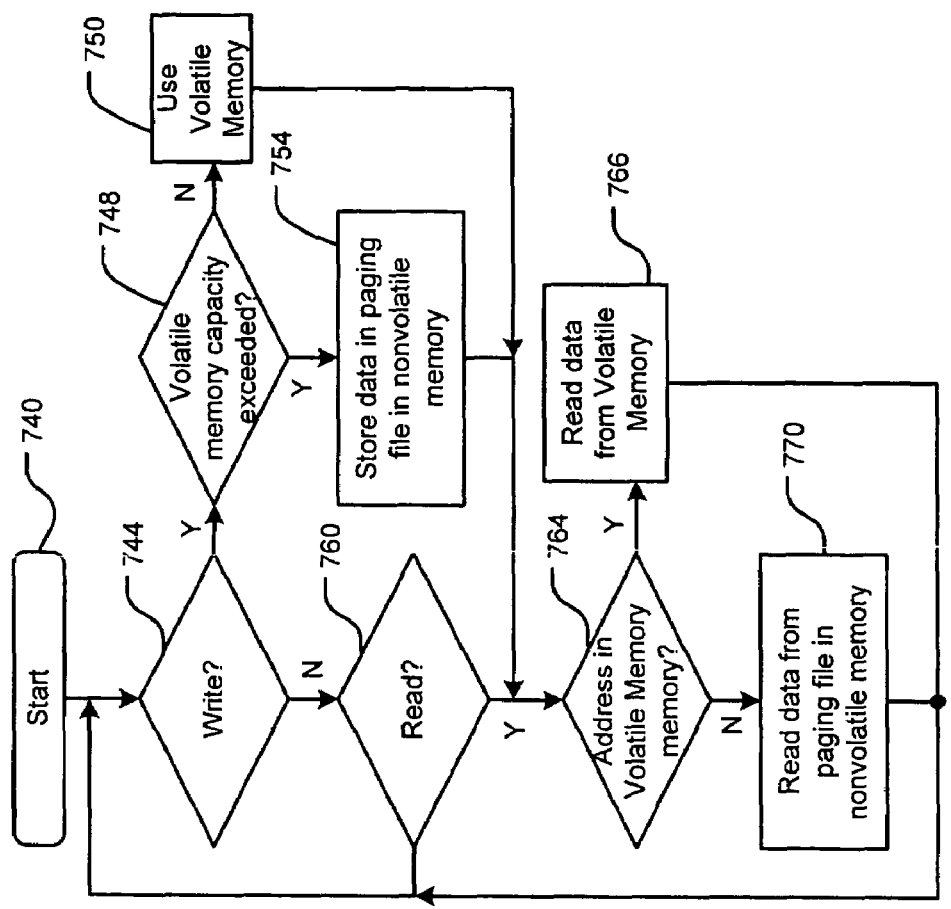
FIG. 18
FIG. 19

ADAPTIVE STORAGE SYSTEM

CROSS-REFERENCE TO RELATED APPLICATIONS

This application is related to U.S. patent application Ser. No. 10/779,544, which was filed on Feb. 13, 2004 and related to U.S. patent application Ser. No. 10/865,732, which was filed on Jun 10, 2004, and which are hereby incorporated by reference in their entirety.

FIELD OF THE INVENTION

The present invention relates to data storage systems, and more particularly to low power data storage systems.

BACKGROUND OF THE INVENTION

Laptop computers are powered using both line power and battery power. The processor, graphics processor, memory and display of the laptop computer consume a significant amount of power during operation. One significant limitation of laptop computers relates to the amount of time that the laptop can be operated using batteries without recharging. The relatively high power dissipation of the laptop computer usually corresponds to a relatively short battery life.

Referring now to FIG. 1A, an exemplary computer architecture 4 is shown to include a processor 6 with memory 7 such as cache. The processor 6 communicates with an input/output (I/O) interface 8. Volatile memory 9 such as random access memory (RAM) 10 and/or other suitable electronic data storage also communicates with the interface 8. A graphics processor 11 and memory 12 such as cache increase the speed of graphics processing and performance.

One or more I/O devices such as a keyboard 13 and a pointing device 14 (such as a mouse and/or other suitable device) communicate with the interface 8. A high power disk drive (HPDD) 15 such as a hard disk drive having one or more platters with a diameter greater than 1.8" provides nonvolatile memory, stores data and communicates with the interface 8. The HPDD 15 typically consumes a relatively high amount of power during operation. When operating on batteries, frequent use of the HPDD 15 will significantly decrease battery life. The computer architecture 4 also includes a display 16, an audio output device 17 such as audio speakers and/or other input/output devices that are generally identified at 18.

Referring now to FIG. 1B, an exemplary computer architecture 20 includes a processing chipset 22 and an I/O chipset 24. For example, the computer architecture may be a Northbridge/Southbridge architecture (with the processing chipset corresponding to the Northbridge chipset and the I/O chipset corresponding to the Southbridge chipset) or other similar architecture. The processing chipset 22 communicates with a processor 25 and a graphics processor 26 via a system bus 27. The processing chipset 22 controls interaction with volatile memory 28 (such as external DRAM or other memory), a Peripheral Component Interconnect (PCI) bus 30, and/or Level 2 cache 32. Level 1 cache 33 and 34 may be associated with the processor 25 and/or the graphics processor 26, respectively. In an alternate embodiment, an Accelerated Graphics Port (AGP) (not shown) communicates with the processing chipset 22 instead of and/or in addition to the graphics processor 26. The processing chipset 22 is typically but not necessarily implemented using multiple chips. PCI slots 36 interface with the PCI bus 30.

The I/O chipset 24 manages the basic forms of input/output (I/O). The I/O chipset 24 communicates with an Universal Serial Bus (USB) 40, an audio device 41, a keyboard (KBD) and/or pointing device 42, and a Basic Input/Output System (BIOS) 43 via an Industry Standard Architecture (ISA) bus 44. Unlike the processing chipset 22, the I/O chipset 24 is typically (but not necessarily) implemented using a single chip, which is connected to the PCI bus 30. A HPDD 50 such as a hard disk drive also communicates with the I/O chipset 24. The HPDD 50 stores a full-featured operating system (OS) such as Windows XP® Windows 2000®, Linux and MACP®-based OS that is executed by the processor 25.

SUMMARY OF THE INVENTION

A disk drive system according to the present invention for a computer with high power and low power modes comprises a low power disk drive (LPDD) and a high power disk drive (HPDD). A control module includes a least used block (LUB) module that identifies a LUB in the LPDD. The control module selectively transfers the LUB to the HPDD during the low power mode when at least one of a data storing request and a data retrieving request is received.

In other features, during the storing request for write data, the control module transfers the write data to the LPDD if sufficient space is available on the LPDD for the write data. If there is insufficient space available for the write data on the LPDD, the control module powers the HPDD and transfers the LUB from the LPDD to the HPDD and the write data to the LPDD.

In yet other features, the control module includes an adaptive storage module that determines whether the write data is likely to be used before the LUB when there is insufficient space available for the write data on the LPDD. If the write data is likely to be used after the LUB, the control module stores the write data on the HPDD. If the write data is likely to be used before the LUB, the control module powers the HPDD and transfers the LUB from the LPDD to the HPDD and the write data to the LPDD.

In still other features, during the data retrieving request for read data, the control module retrieves the read data from the LPDD if the read data is stored in the LPDD. The control module includes an adaptive storage module that determines whether the read data is likely to be used once when the read data is not located on the LPDD. The control module retrieves the read data from the HPDD if the read data is likely to be used once. If the adaptive storage module determines that the read data is likely to be used more than once, the control module transfers the read data from the HPDD to the LPDD if sufficient space is available on the LPDD for the read data. If the adaptive storage module determines that the read data is likely to be used more than once, the control module transfers the LUB from the LPDD to the HPDD and the read data from the HPDD to the LPDD if sufficient space is not available on the LPDD for the read data.

In still other features, the control module transfers the read data from the HPDD to the LPDD if sufficient space is available on the LPDD for the read data. The control module transfers the LUB from the LPDD to the HPDD and the read data from the HPDD to the LPDD if sufficient space is not available on the LPDD for the read data. If the read data is not located on the LPDD, the control module retrieves the read data from the HPDD.

In still other features, the HPDD includes one or more platters, wherein the one or more platters have a diameter that is greater than 1.8". The LPDD includes one or more platters, wherein the one or more platters have a diameter that is less than or equal to 1.8".

A disk drive system according to the present invention for a computer with high power and low power modes comprises a low power disk drive (LPDD) and a high power disk drive (HPDD). A control module communicates with the LPDD and the HPDD. During a storing request for write data in the low power mode, the control module determines whether there is sufficient space available on the LPDD for the write data and transfers the write data to the LPDD if sufficient space is available.

In other features, the control module stores the write data on the HPDD if insufficient space is available. The control module further includes a LPDD maintenance module that transfers data files from the LPDD to the HPDD during the high power mode to increase available disk space on the LPDD. The LPDD maintenance module transfers the data files based on at least one of age, size and likelihood of future use in the low power mode. The HPDD includes one or more platters having a diameter that is greater than 1.8". The LPDD includes one or more platters having a diameter that is less than or equal to 1.8".

A data storage system according to the present invention for a computer including low power and high power modes comprises low power (LP) nonvolatile memory and high power (HP) nonvolatile memory. A cache control module communicates with the LP and HP nonvolatile memory and includes an adaptive storage module. When write data is to be written to one of the LP and HP nonvolatile memory, the adaptive storage module generates an adaptive storage decision that selects one of the LP and HP nonvolatile memory.

In other features, the adaptive decision is based on at least one of power modes associated with prior uses of the write data, a size of the write data, a date of last use of the write data and a manual override status of the write data. The LP nonvolatile memory includes at least one of flash memory and a low power disk drive (LPDD). The LPDD includes one or more platters, wherein the one or more platters have a diameter that is less than or equal to 1.8". The HP nonvolatile memory comprises a hard disk drive including one or more platters, wherein the one or more platters have a diameter that is greater than 1.8".

A data storage system according to the present invention for a computer including low power and high power modes comprises low power (LP) nonvolatile memory and high power (HP) nonvolatile memory. A cache control module communicates with the LP and HP nonvolatile memory and includes a drive power reduction module. When read data is read from the HP nonvolatile memory during the low power mode and the read data includes a sequential access data file, the drive power reduction module calculates a burst period for transfers of segments of the read data from the HP nonvolatile memory to LP nonvolatile memory.

In other features, the drive power reduction module selects the burst period to reduce power consumption during playback of the read data during the low power mode. The LP nonvolatile memory includes at least one of flash memory and a low power disk drive (LPDD). The LPDD includes one or more platters, wherein the one or more platters have a diameter that is less than or equal to 1.8". The HP nonvolatile memory comprises a high power disk drive (HPDD). The HPDD includes one or more platters, wherein the one or more platters have a diameter that is greater than 1.8". The burst period is based on at least one of spin-up time of the LPDD, spin-up time of the HPDD, power consumption of the LPDD, power consumption of the HPDD, playback length of the read data, and capacity of the LPDD.

A multi-disk drive system according to the present invention comprises a high power disk drive (HPDD) including one or more platters, wherein the one or more platters have a diameter that is greater than 1.8" and a low power disk drive (LPDD) including one or more platters, wherein the one or more platters have a diameter that is less than or equal to 1.8". A drive control module collectively controls data access to the LPDD and the HPDD.

A redundant array of independent disks (RAID) system according to the present invention comprises a first disk array that includes X high power disk drives (HPDD), wherein X is greater than or equal to 2. A second disk array includes Y low power disk drives (LPDD), wherein Y is greater than or equal to 1. An array management module communicates with the first and second disk arrays and utilizes the second disk array to cache data to and/or from the first disk array.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8A illustrates a cache control module that includes an adaptive storage control module and that controls storage and transfer of data between the LPDD and HPDD;

FIG. 8B illustrates an operating system that includes an adaptive storage control module and that controls storage and transfer of data between the LPDD and the HPDD;

FIG. 10 is an exemplary table illustrating one method for determining the likelihood that a program or file will be used during the low power mode;

FIG. 12 illustrates steps performed by the disk drive power reduction modules of FIGS. 11A-11C;

FIG. 18 illustrates the use of low power nonvolatile memory such as Flash memory or a low power disk drive (LPDD) for increasing virtual memory of a computer;

FIGS. 19 and 20 illustrates steps performed by the operating system to allocate and use the virtual memory of FIG. 18;

DETAILED DESCRIPTION OF THE PREFERRED EMBODIMENTS

Figure 1A:
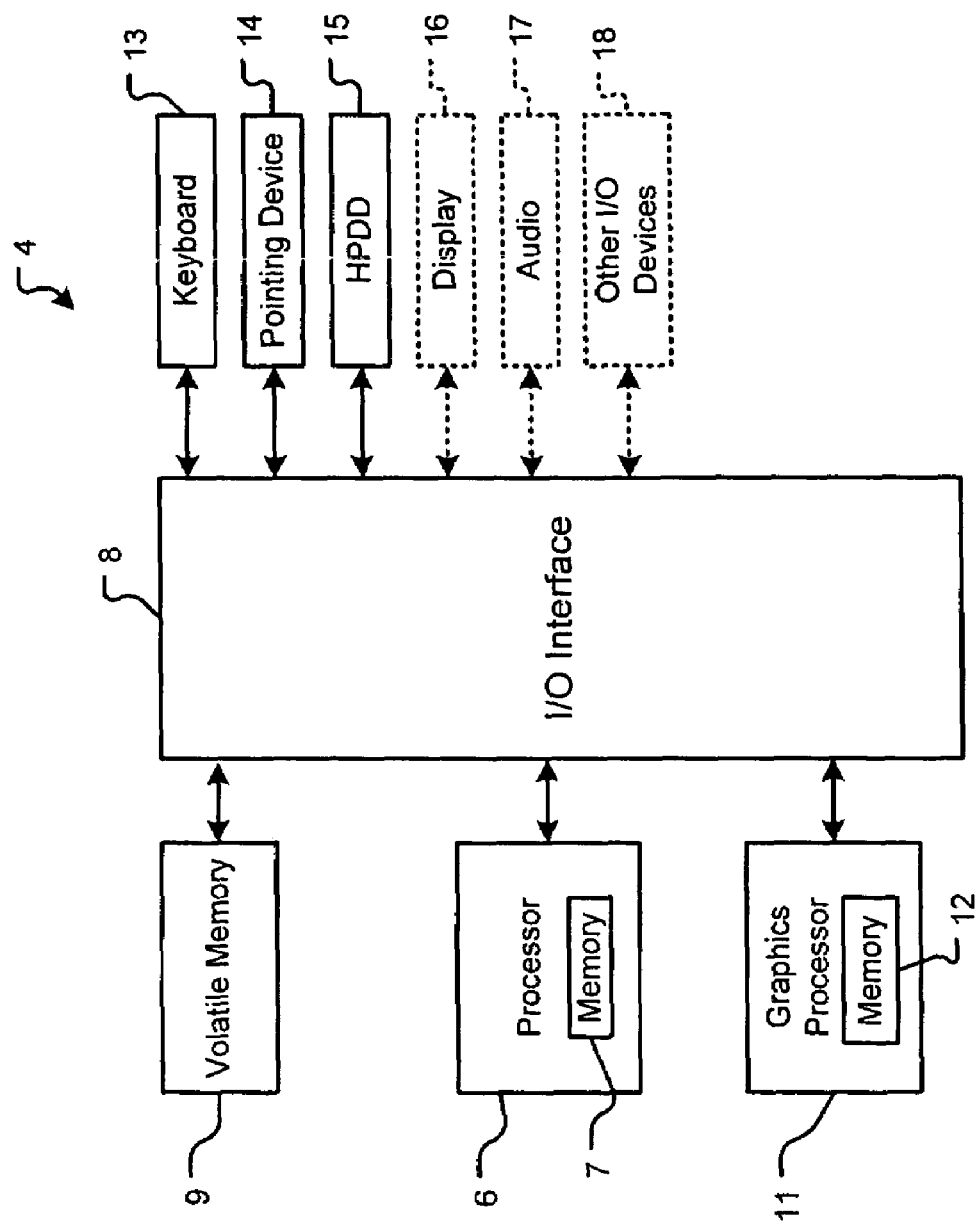
FIGS. 1A and 1B illustrate exemplary computer architectures according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

As used herein, the term "high power mode" refers to active operation of the host processor and/or the primary graphics processor of the host device. The term "low power mode" refers to low-power hibernating modes, off modes, and/or non-responsive modes of the primary processor and/or primary graphics processor when a secondary processor and a secondary graphics processor are operable. An "off mode" refers to situations when both the primary and secondary processors are off.

The term "low power disk drive" or LPDD refers to disk drives and/or microdrives having one or more platters that have a diameter that is less than or equal to 1.8". The term "high power disk drive" or HPDD refers to hard disk drives having one or more platters that have a diameter that is greater than 1.8". LPDDs typically have lower storage capacities and dissipate less power than the HPDDs. The LPDDs are also rotated at a higher speed than the HPDDs. For example, rotational speeds of 10,000-20,000 RPM or greater can be achieved with LPDDs.

Figure 1B:
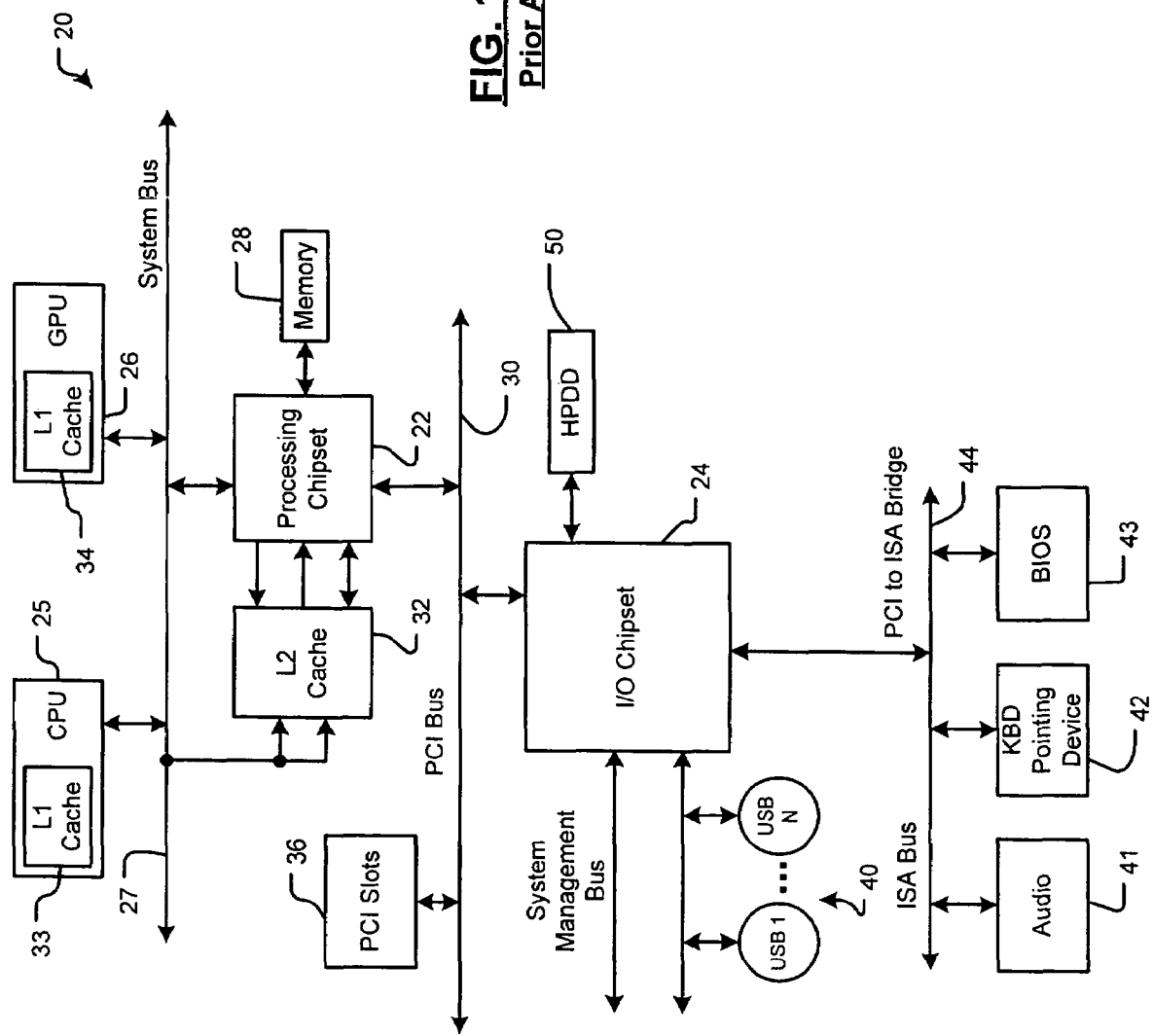

The computer architecture according to the present invention includes the primary processor, the primary graphics processor, and the primary memory (as described in conjunction with FIGS. 1A and 1B), which operate during the high power mode. A secondary processor and a secondary graphics processor are operated during the low power mode. The secondary processor and the secondary graphics processor may be connected to various components of the computer, as will be described below. Primary volatile memory may be used by the secondary processor and the secondary graphics processor during the low power mode. Alternatively, secondary volatile memory, such as DRAM and/or embedded secondary volatile memory such as embedded DRAM can be used, as will be described below.

The primary processor and the primary graphics processor dissipate relatively high power when operating in the high power mode. The primary processor and the primary graphics processor execute a full-featured operating system (OS) that requires a relatively large amount of external memory. The primary processor and the primary graphics processor support high performance operation including complex computations and advanced graphics. The full-featured OS can be a Windows®-based OS such as Windows XP®, a Linux-based OS, a MAC®-based OS and the like. The full-featured OS is stored in the HPDD 15 and/or 50.

The secondary processor and the secondary graphics processor dissipate less power (than the primary processor and primary graphics processor) during the low power mode. The secondary processor and the secondary graphics processor operate a restricted-feature operating system (OS) that requires a relatively small amount of external volatile memory. The secondary processor and secondary graphics processor may also use the same OS as the primary processor. For example, a pared-down version of the full-featured OS may be used. The secondary processor and the secondary graphics processor support lower performance operation, a lower computation rate and less advanced graphics. For example, the restricted-feature OS can be Windows CE® or any other suitable restricted-feature OS. The restricted-feature OS is preferably stored in nonvolatile memory such as Flash memory and/or a LPDD. In a preferred embodiment, the full-featured and restricted-feature OS share a common data format to reduce complexity.

The primary processor and/or the primary graphics processor preferably include transistors that are implemented using a fabrication process with a relatively small feature size. In one implementation, these transistors are implemented using an advanced CMOS fabrication process. Transistors implemented in the primary processor and/or primary graphics processor have relatively high standby leakage, relatively short channels and are sized for high speed. The primary processor and the primary graphics processor preferably employ predominantly dynamic logic. In other words, they cannot be shut down. The transistors are switched at a duty cycle that is less than approximately 20% and preferably less than approximately 10%, although other duty cycles may be used.

In contrast, the secondary processor and/or the secondary graphics processor preferably include transistors that are implemented with a fabrication process having larger feature sizes than the process used for the primary processor and/or primary graphics processor. In one implementation, these transistors are implemented using a regular CMOS fabrication process. The transistors implemented in the secondary processor and/or the secondary graphics processor have relatively low standby leakage, relatively long channels and are sized for low power dissipation. The secondary processor and the secondary graphics processor preferably employ predominantly static logic rather than dynamic logic. The transistors are switched at a duty cycle that is greater than 80% and preferably greater than 90%, although other duty cycles may be used.

The primary processor and the primary graphics processor dissipate relatively high power when operated in the high power mode. The secondary processor and the secondary graphics processor dissipate less power when operating in the low power mode. In the low power mode, however, the computer architecture is capable of supporting fewer features and computations and less complex graphics than when operating in the high power mode. As can be appreciated by skilled artisans, there are many ways of implementing the computer architecture according to the present invention. Therefore, skilled artisans will appreciate that the architectures that are described below in conjunction with FIGS. 2A-4C are merely exemplary in nature and are not limiting.

Figure 2A:
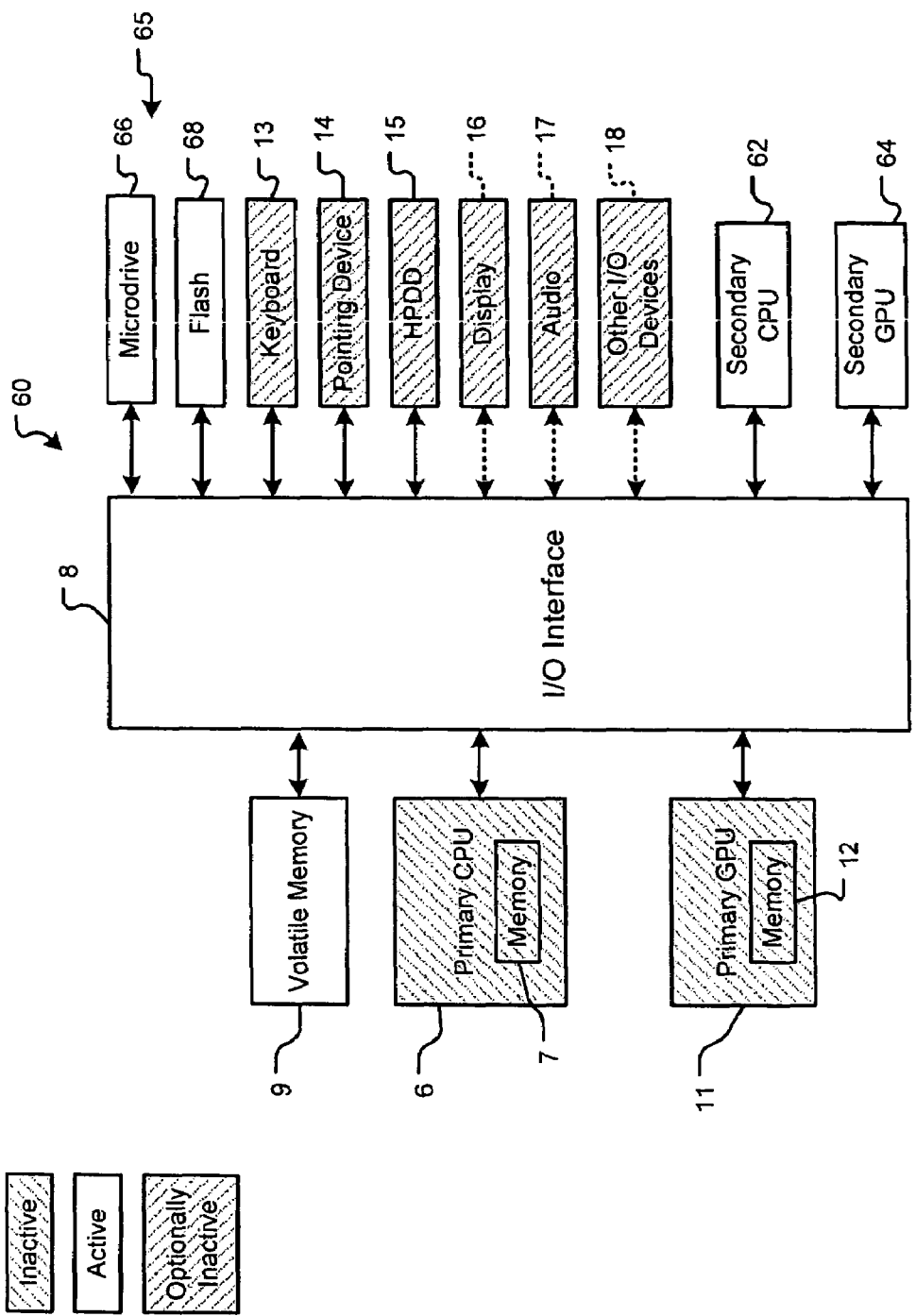
FIG. 2A illustrates a first exemplary computer architecture according to the present invention with a primary processor, a primary graphics processor, and primary volatile memory that operate during an high power mode and a secondary processor and a secondary graphics processor that communicate with the primary processor, that operate during a low power mode and that employ the primary volatile memory during the low power mode.

Referring now to FIG. 2A, a first exemplary computer architecture 60 is shown. The primary processor 6, the volatile memory 9 and the primary graphics processor 11 communicate with the interface 8 and support complex data and graphics processing during the high power mode. A secondary processor 62 and a secondary graphics processor 64 communicate with the interface 8 and support less complex data and graphics processing during the low power mode. Optional nonvolatile memory 65 such as a LPDD 66 and/or Flash memory 68 communicates with the interface 8 and provides low power nonvolatile storage of data during the low power and/or high power modes. The HPDD 15 provides high power/capacity nonvolatile memory. The nonvolatile memory 65 and/or the HPDD 15 are used to store the restricted feature OS and/or other data and files during the low power mode.

In this embodiment, the secondary processor 62 and the secondary graphics processor 64 employ the volatile memory 9 (or primary memory) while operating in the low-power mode. To that end, at least part of the interface 8 is powered during the low power mode to support communications with the primary memory and/or communications between components that are powered during the low power mode. For example, the keyboard 13, the pointing device 14 and the primary display 16 may be powered and used during the low power mode. In all of the embodiments described in conjunction with FIGS. 2A-4C, a secondary display with reduced capabilities (such as a monochrome display) and/or a secondary input/output device can also be provided and used during the low power mode.

Figure 2B:
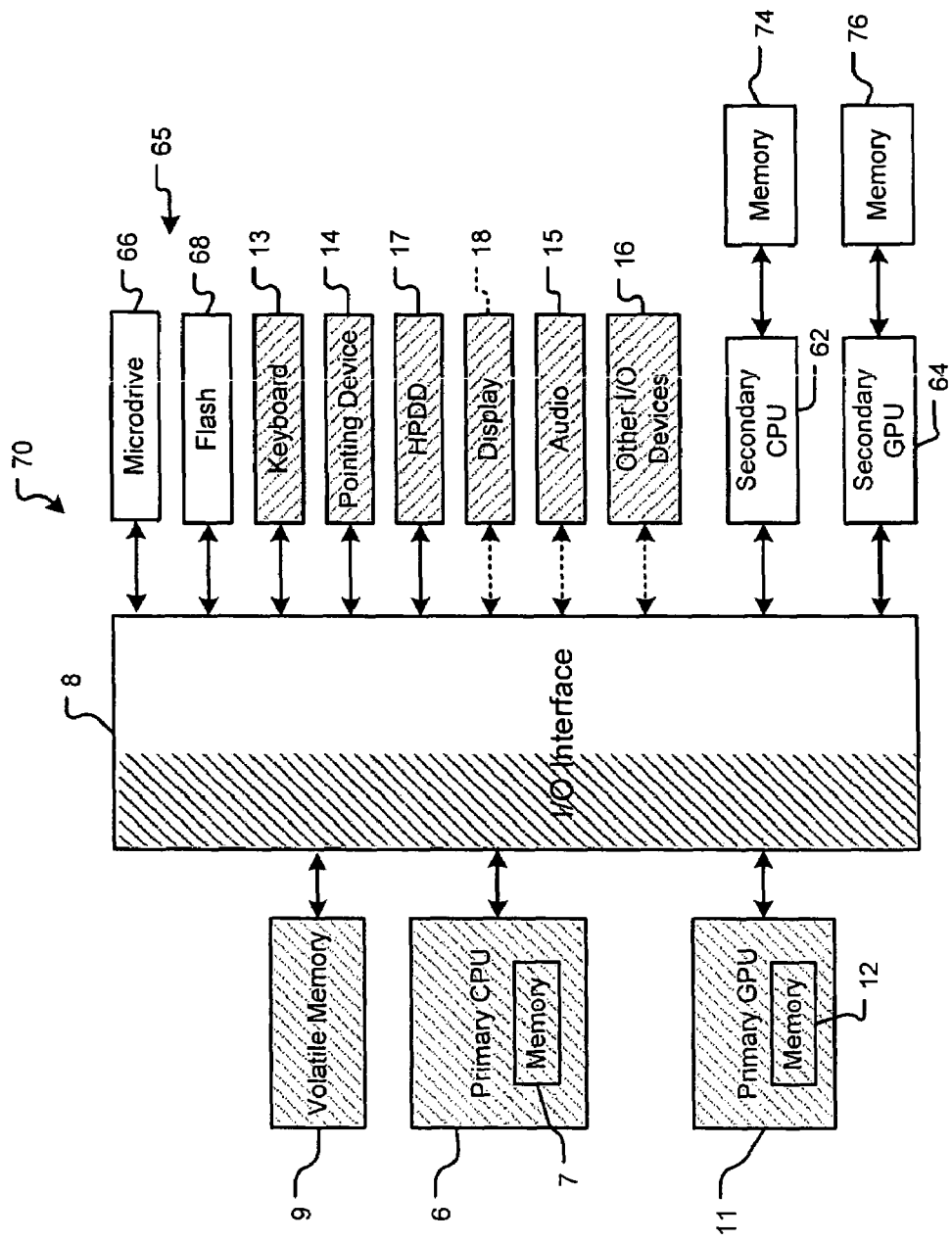
FIG. 2B illustrates a second exemplary computer architecture according to the present invention that is similar to FIG. 2A and that includes secondary volatile memory that is connected to the secondary processor and/or the secondary graphics processor.

Referring now to FIG. 2B, a second exemplary computer architecture 70 that is similar to the architecture in FIG. 2A is shown. In this embodiment, the secondary processor 62 and the secondary graphics processor 64 communicate with secondary volatile memory 74 and/or 76. The secondary volatile memory 74 and 76 can be DRAM or other suitable memory. During the low power mode, the secondary processor 62 and the secondary graphics processor 64 utilize the secondary volatile memory 74 and/or 76, respectively, in addition to and/or instead of the primary volatile memory 9 shown and described in FIG. 2A.

Figure 2C:
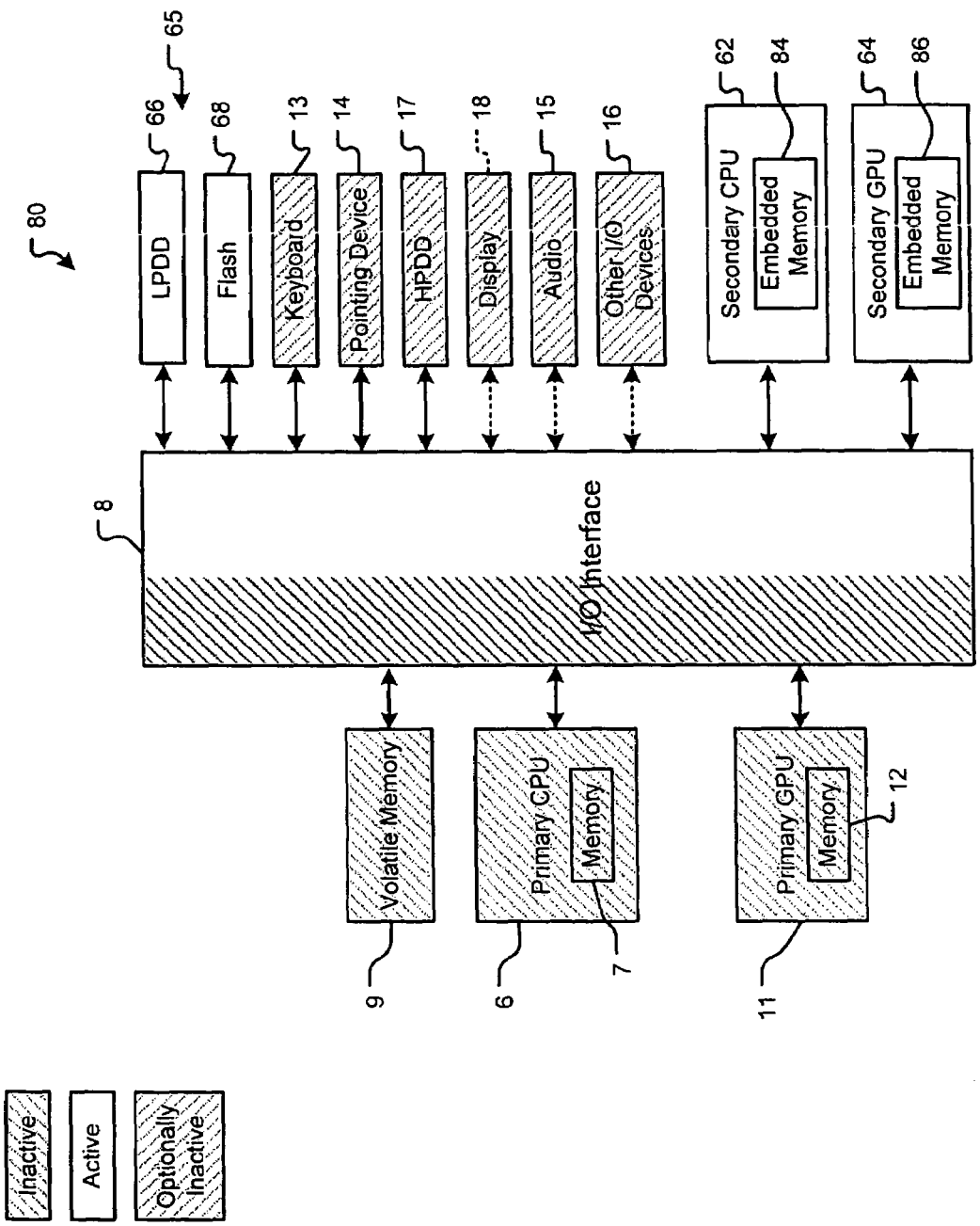
FIG. 2C illustrates a third exemplary computer architecture according to the present invention that is similar to FIG. 2A and that includes embedded volatile memory that is associated with the secondary processor and/or the secondary graphics processor.

Referring now to FIG. 2C, a third exemplary computer architecture 80 that is similar to FIG. 2A is shown. The secondary processor 62 and/or secondary graphics processor 64 include embedded volatile memory 84 and 86, respectively. During the low power mode, the secondary processor 62 and the secondary graphics processor 64 utilize the embedded volatile memory 84 and/or 86, respectively, in addition to and/or instead of the primary volatile memory. In one embodiment, the embedded volatile memory 84 and 86 is embedded DRAM (eDRAM), although other types of embedded volatile memory can be used.

Figure 3A:
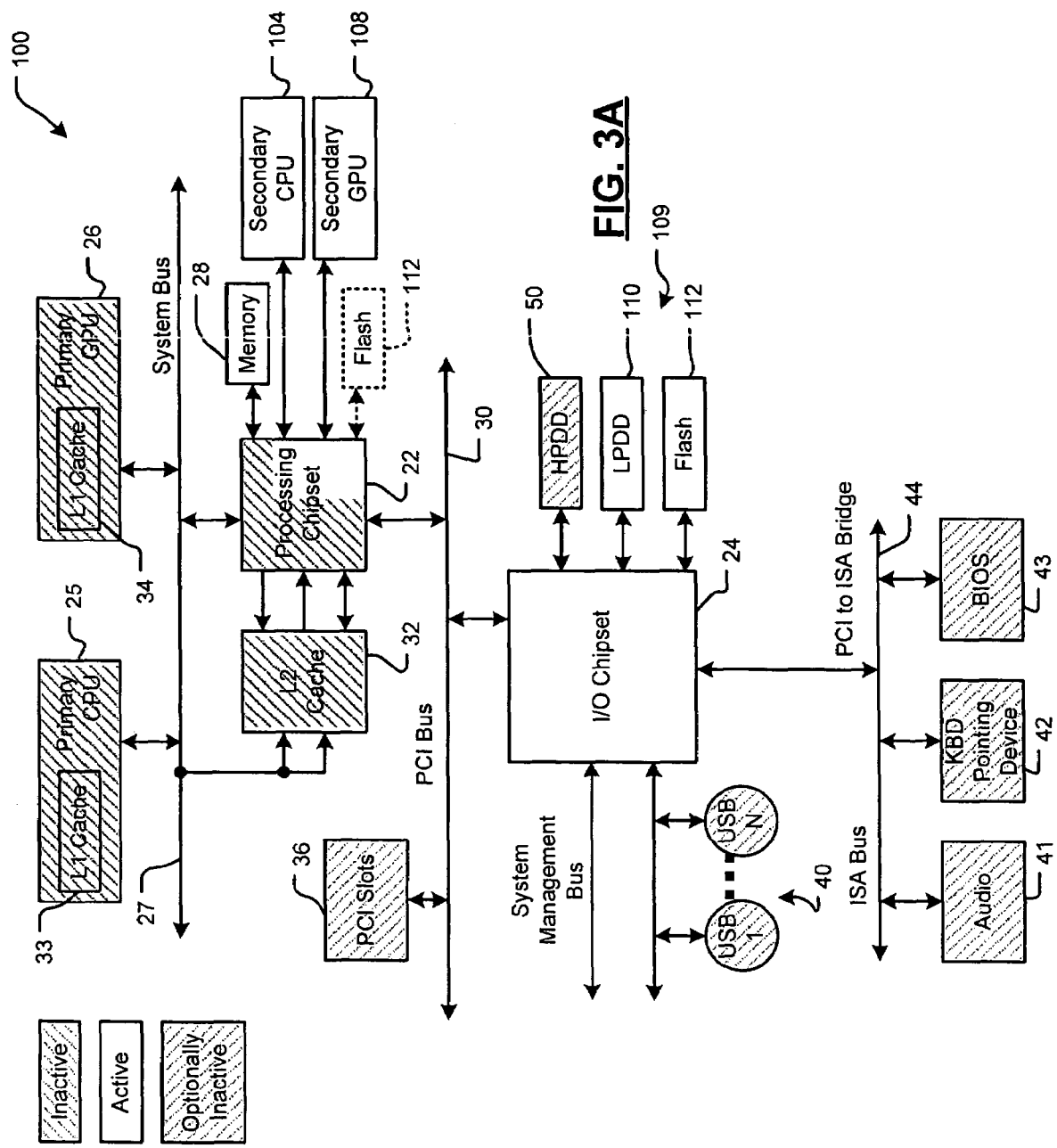
FIG. 3A illustrates a fourth exemplary architecture according to the present invention for a computer with a primary processor, a primary graphics processor, and primary volatile memory that operate during an high power mode and a secondary processor and a secondary graphics processor that communicate with a processing chipset, that operate during the low power mode and that employ the primary volatile memory during the low power mode.

Referring now to FIG. 3A, a fourth exemplary computer architecture 100 according to the present invention is shown. The primary processor 25, the primary graphics processor 26, and the primary volatile memory 28 communicate with the processing chipset 22 and support complex data and graphics processing during the high power mode. A secondary processor 104 and a secondary graphics processor 108 support less complex data and graphics processing when the computer is in the low power mode. In this embodiment, the secondary processor 104 and the secondary graphics processor 108 employ the primary volatile memory 28 while operating in the low power mode. To that end, the processing chipset 22 may be fully and/or partially powered during the low power mode to facilitate communications therebetween. The HPDD 50 may be powered during the low power mode to provide high power volatile memory. Low power nonvolatile memory 109 (LPDD 110 and/or Flash memory 112) is connected to the processing chipset 22, the I/O chipset 24 or in another location and stores the restricted-feature operating system for the low power mode.

The processing chipset 22 may be fully and/or partially powered to support operation of the HPDD 50, the LPDD 110, and/or other components that will be used during the low power mode. For example, the keyboard and/or pointing device 42 and the primary display may be used during the low power mode.

Figure 3B:
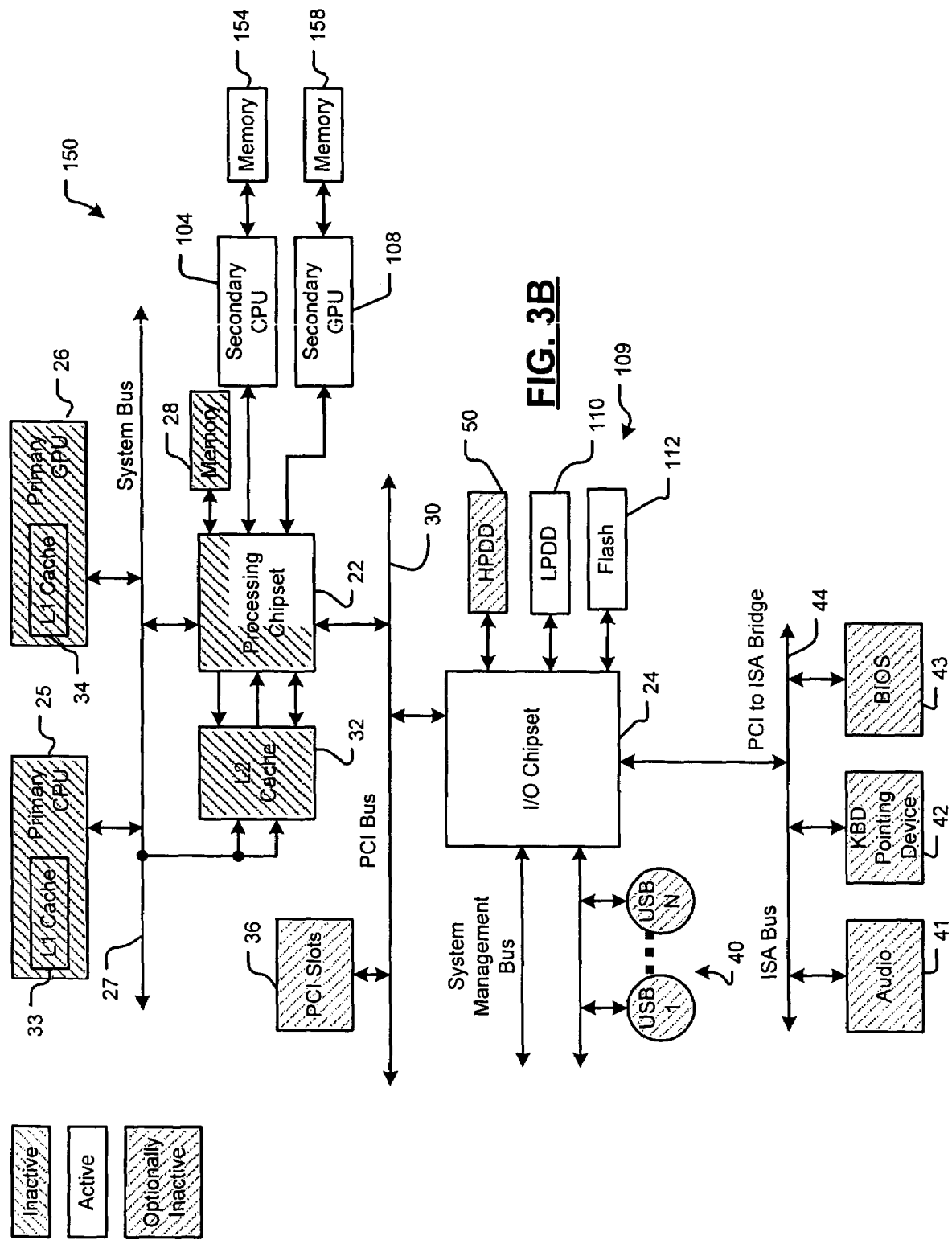
FIG. 3B illustrates a fifth exemplary computer architecture according to the present invention that is similar to FIG. 3A and that includes secondary volatile memory connected to the secondary processor and/or the secondary graphics processor.

Referring now to FIG. 3B, a fifth exemplary computer architecture 150 that is similar to FIG. 3A is shown. Secondary volatile memory 154 and 158 is connected to the secondary processor 104 and/or secondary graphics processor 108, respectively. During the low power mode, the secondary processor 104 and the secondary graphics processor 108 utilize the secondary volatile memory 154 and 158, respectively, instead of and/or in addition to the primary volatile memory 28. The processing chipset 22 and the primary volatile memory 28 can be shut down during the low power mode if desired. The secondary volatile memory 154 and 158 can be DRAM or other suitable memory.

Figure 3C:
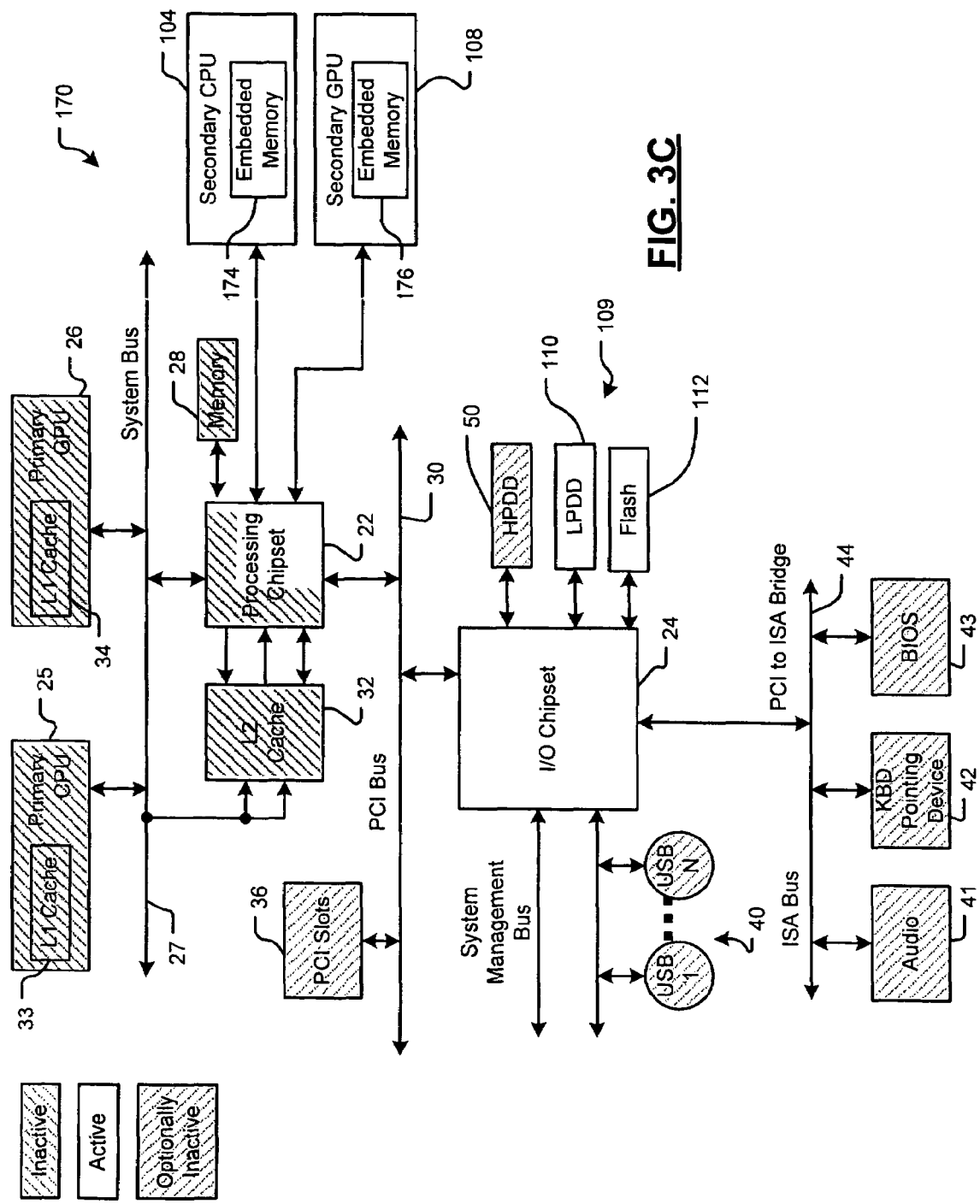
FIG. 3C illustrates a sixth exemplary computer architecture according to the present invention that is similar to FIG. 3A and that includes embedded volatile memory that is associated with the secondary processor and/or the secondary graphics processor.

Referring now to FIG. 3C, a sixth exemplary computer architecture 170 that is similar to FIG. 3A is shown. The secondary processor 104 and/or secondary graphics processor 108 include embedded memory 174 and 176, respectively. During the low power mode, the secondary processor 104 and the secondary graphics processor 108 utilize the embedded memory 174 and 176, respectively, instead of and/or in addition to the primary volatile memory 28. In one embodiment, the embedded volatile memory 174 and 176 is embedded DRAM (eDRAM), although other types of embedded memory can be used.

Figure 4A:
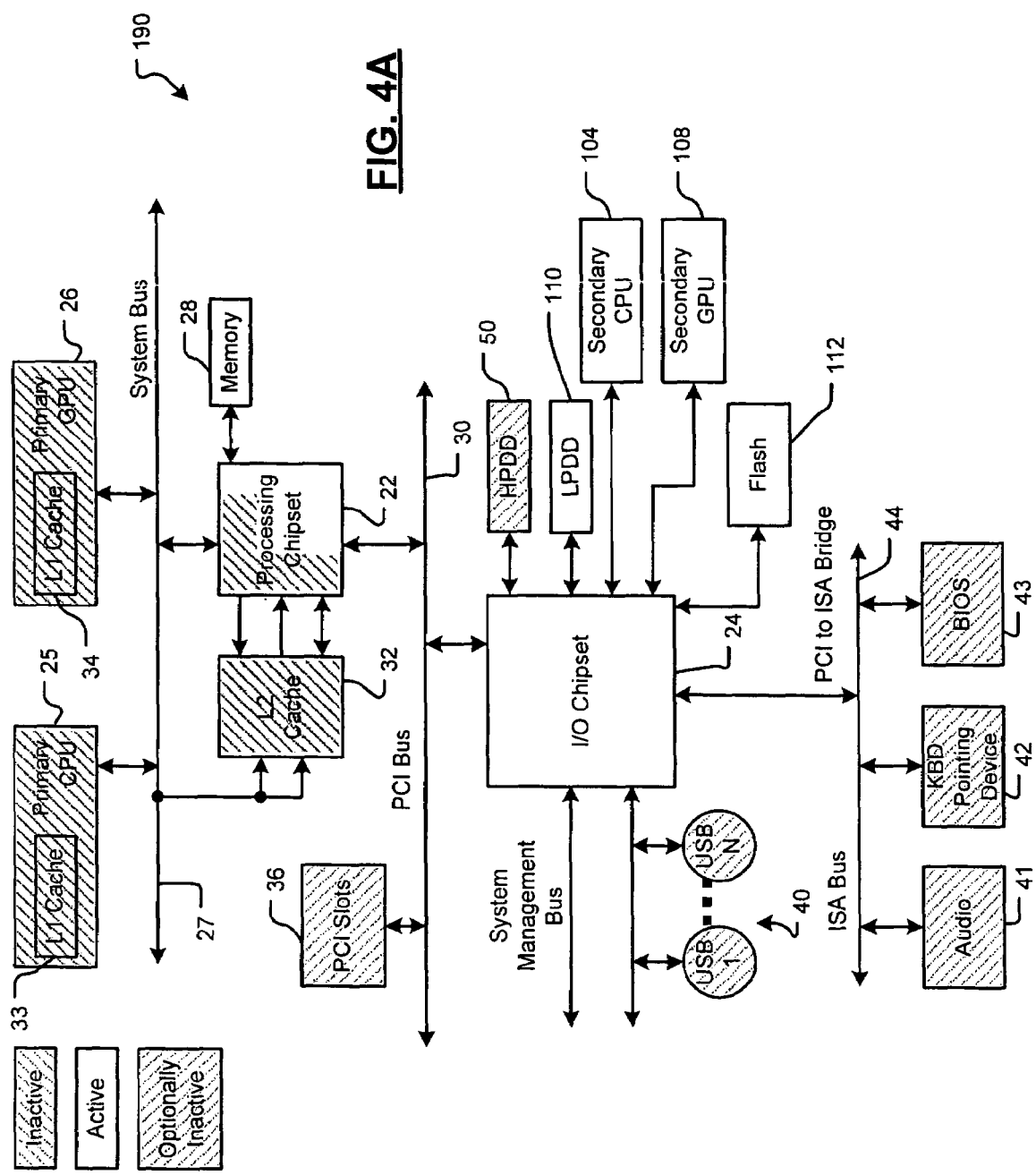
FIG. 4A illustrates a seventh exemplary architecture according to the present invention for a computer with a secondary processor and a secondary graphics processor that communicate with an I/O chipset, that operate during the low power mode and that employ the primary volatile memory during the low power mode.

Referring now to FIG. 4A, a seventh exemplary computer architecture 190 according to the present invention is shown. The secondary processor 104 and the secondary graphics processor 108 communicate with the I/O chipset 24 and employ the primary volatile memory 28 as volatile memory during the low power mode. The processing chipset 22 remains fully and/or partially powered to allow access to the primary volatile memory 28 during the low power mode.

Figure 4B:
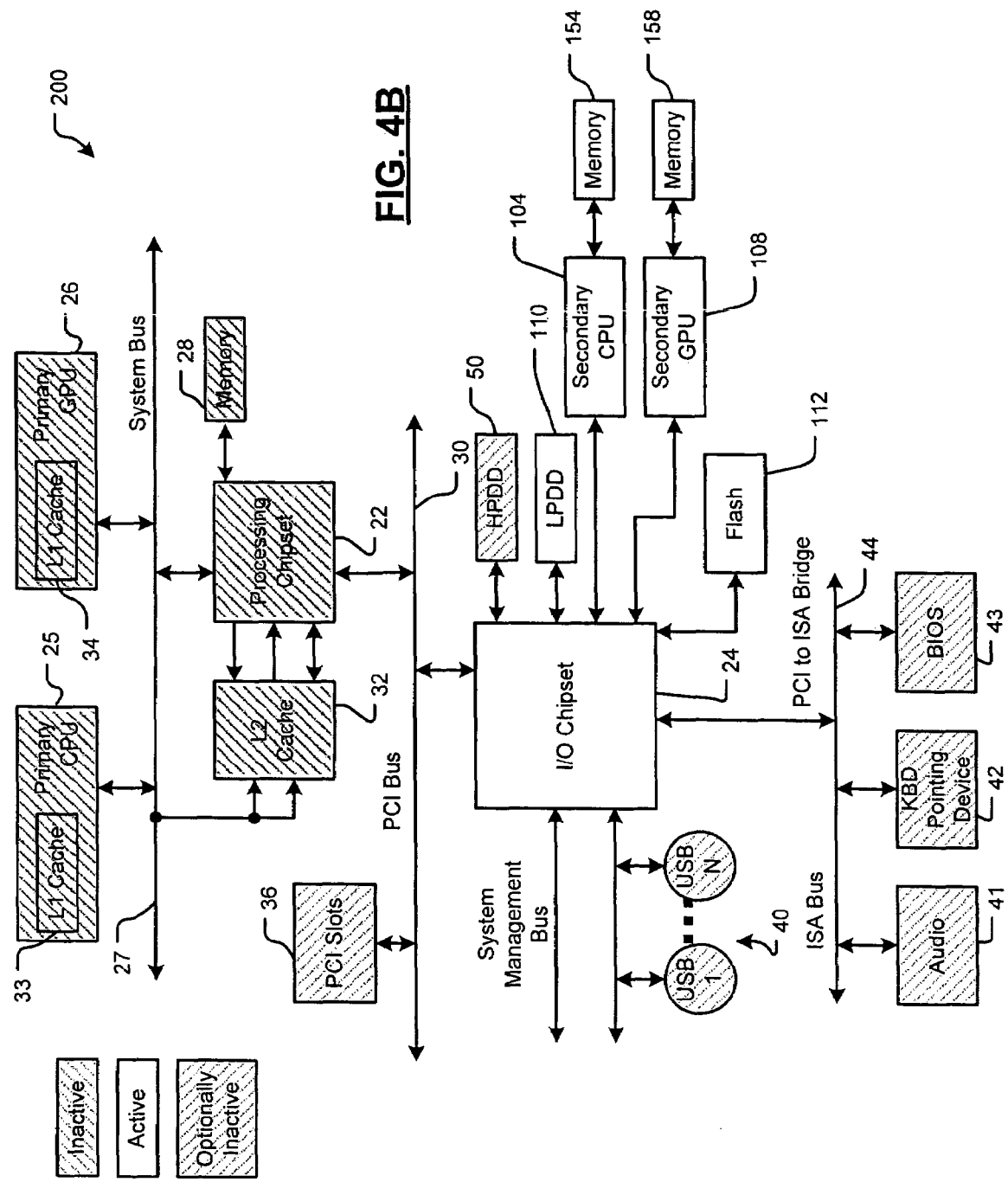
FIG. 4B illustrates an eighth exemplary computer architecture according to the present invention that is similar to FIG. 4A and that includes secondary volatile memory connected to the secondary processor and/or the secondary graphics processor.

Referring now to FIG. 4B, an eighth exemplary computer architecture 200 that is similar to FIG. 4A is shown. Secondary volatile memory 154 and 158 is connected to the secondary processor 104 and the secondary graphics processor 108, respectively, and is used instead of and/or in addition to the primary volatile memory 28 during the low power mode. The processing chipset 22 and the primary volatile memory 28 can be shut down during the low power mode.

Figure 4C:
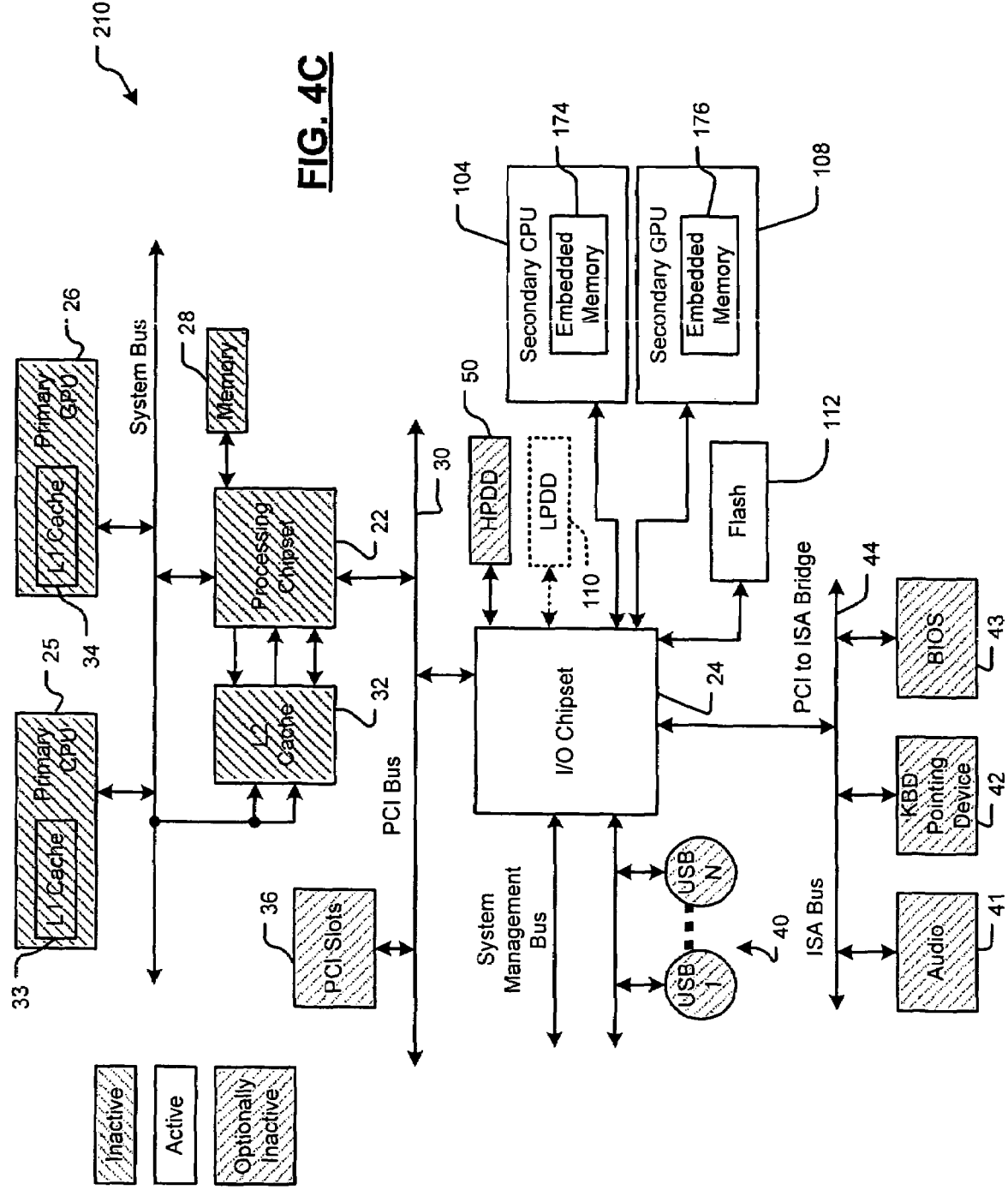
FIG. 4C illustrates a ninth exemplary computer architecture according to the present invention that is similar to FIG. 4A and that includes embedded volatile memory that is associated with the secondary processor and/or the secondary graphics processor.

Referring now to FIG. 4C, a ninth exemplary computer architecture 210 that is similar to FIG. 4A is shown. Embedded volatile memory 174 and 176 is provided for the secondary processor 104 and/or the secondary graphics processor 108, respectively in addition to and/or instead of the primary volatile memory 28. In this embodiment, the processing chipset 22 and the primary volatile memory 28 can be shut down during the low power mode.

Figure 5:
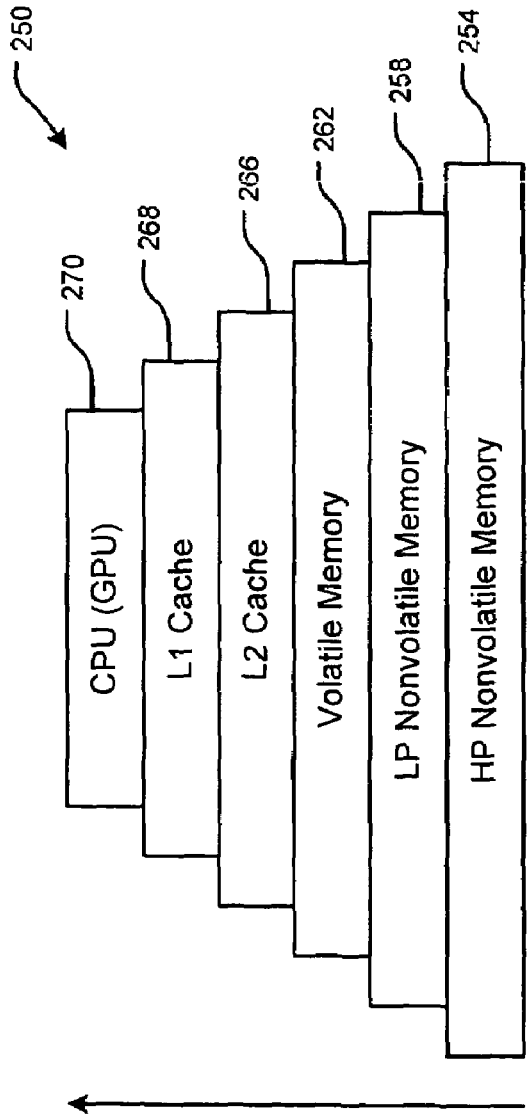
FIG. 5 illustrates a caching hierarchy according to the present invention for the computer architectures of FIGS. 2A-4C.

Referring now to FIG. 5, a caching hierarchy 250 for the computer architectures illustrated in FIGS. 2A-4C is shown. The HP nonvolatile memory HPDD 50 is located at a lowest level 254 of the caching hierarchy 250. Level 254 may or may not be used during the low power mode if the HPDD 50 is disabled and will be used if the HPDD 50 is enabled during the low power mode. The LP nonvolatile memory such as LPDD 110 and/or Flash memory 112 is located at a next level 258 of the caching hierarchy 250. External volatile memory such as primary volatile memory, secondary volatile memory and/or secondary embedded memory is a next level 262 of the caching hierarchy 250, depending upon the configuration. Level 2 or secondary cache comprises a next level 266 of the caching hierarchy 250. Level 1 cache is a next level 268 of the caching hierarchy 250. The CPU (primary and/or secondary) is a last level 270 of the caching hierarchy. The primary and secondary graphics processor use a similar hierarchy.

The computer architecture according to the present invention provides a low power mode that supports less complex processing and graphics. As a result, the power dissipation of the computer can be reduced significantly. For laptop applications, battery life is extended.

Figure 6:
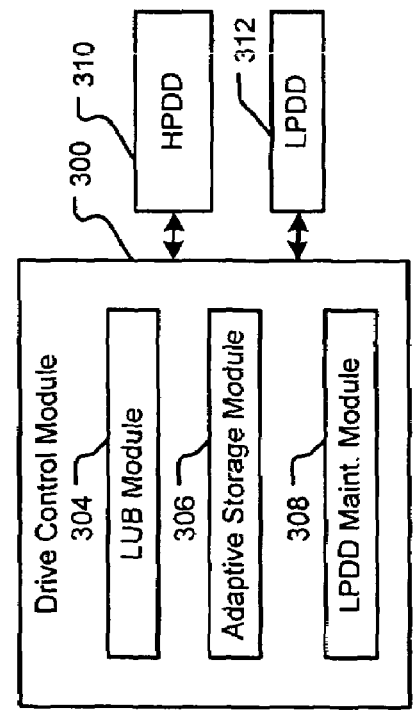
FIG. 6 is a functional block diagram of a drive control module that includes a least used block (LUB) module and that manages storage and transfer of data between the low-power disk drive (LPDD) and the high-power disk drive (HPDD)

Referring now to FIG. 6, a drive control module 300 or host control module for a multi-disk drive system includes a least used block (LUB) module 304, an adaptive storage module 306, and/or a LPDD maintenance module 308. The drive control module 300 controls storage and data transfer between a high-powered disk drive (HPDD) 310 such as a hard disk drive and a low-power disk drive (LPDD) 312 such as a microdrive based in part on LUB information. The drive control module 300 reduces power consumption by managing data storage and transfer between the HPDD and LPDD during the high and low power modes.

The least used block module 304 keeps track of the least used block of data in the LPDD 312. During the low-power mode, the least used block module 304 identifies the least used block of data (such as files and/or programs) in the LPDD 312 so that it can be replaced when needed. Certain data blocks or files may be exempted from the least used block monitoring such as files that relate to the restricted-feature operating system only, blocks that are manually set to be stored in the LPDD 312, and/or other files and programs that are operated during the low power mode only. Still other criteria may be used to select data blocks to be overwritten, as will be described below.

During the low power mode during a data storing request the adaptive storage module 306 determines whether write data is more likely to be used before the least used blocks. The adaptive storage module 306 also determines whether read data is likely to be used only once during the low power mode during a data retrieval request. The LPDD maintenance module 308 transfers aged data from the LPDD to the HPDD during the high power mode and/or in other situations as will be described below.

Figure 7A:
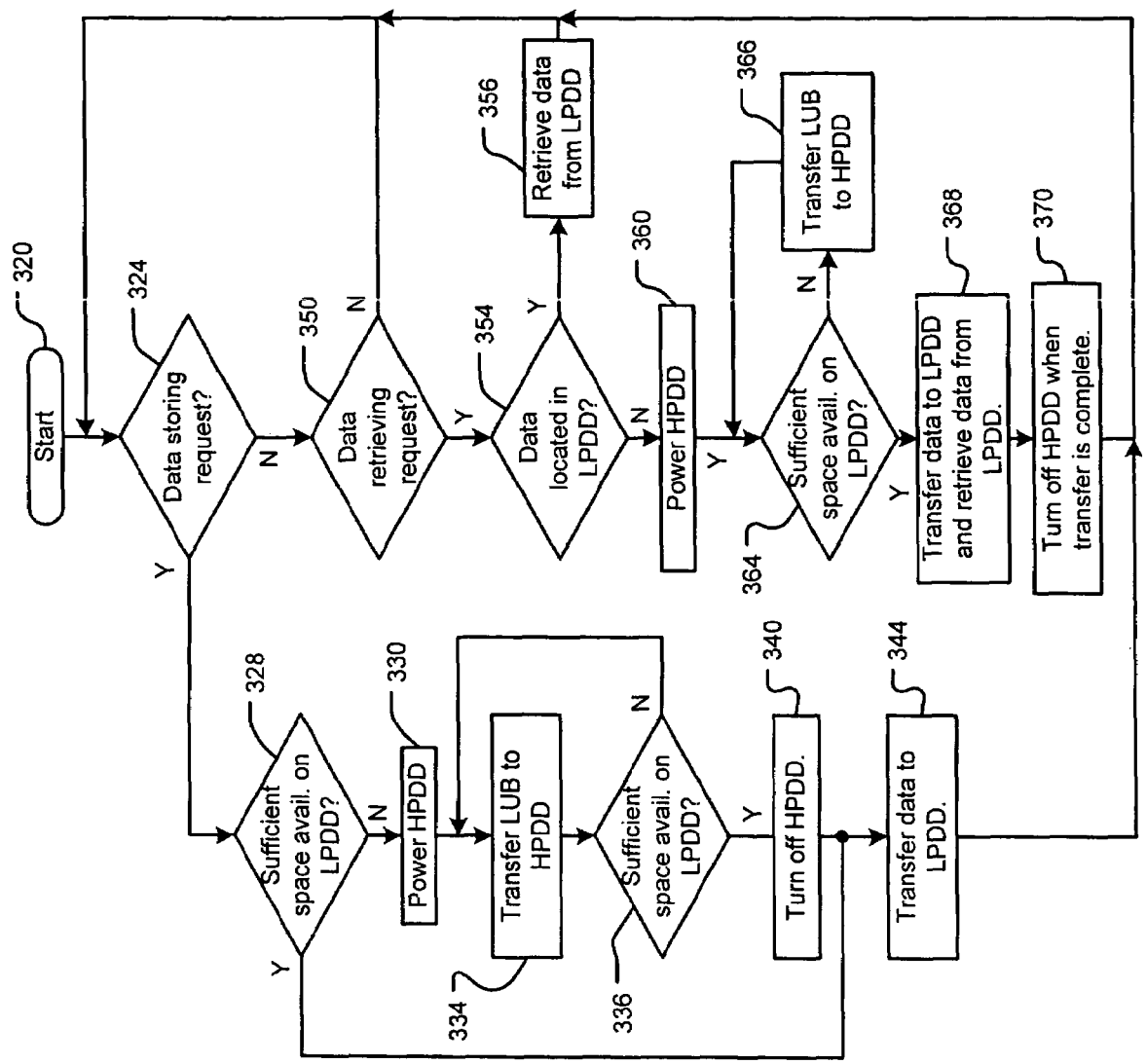
FIG. 7A is a flowchart illustrating steps that are performed by the drive control module of FIG. 6.

Referring now to FIG. 7A, steps performed by the drive control module 300 are shown. Control begins in step 320. In step 324, the drive control module 300 determines whether there is a data storing request. If step 324 is true, the drive control module 300 determines whether there is sufficient space available on the LPDD 312 in step 328. If not, the drive control module 300 powers the HPDD 310 in step 330. In step 334, the drive control module 300 transfers the least used data block to the HPDD 310. In step 336, the drive control module 300 determines whether there is sufficient space available on the LPDD 312. If not, control loops to step 334. Otherwise, the drive control module 300 continues with step 340 and turns off the HPDD 310. In step 344, data to be stored (e.g. from the host) is transferred to the LPDD 312.

If step 324 is false, the drive control module 300 continues with step 350 and determines whether there is a data retrieving request. If not, control returns to step 324. Otherwise, control continues with step 354 and determines whether the data is located in the LPDD 312. If step 354 is true, the drive control module 300 retrieves the data from the LPDD 312 in step 356 and continues with step 324. Otherwise, the drive control module 300 powers the HPDD 310 in step 360. In step 364, the drive control module 300 determines whether there is sufficient space available on the LPDD 312 for the requested data. If not, the drive control module 300 transfers the least used data block to the HPDD 310 in step 366 and continues with step 364. When step 364 is true, the drive control module 300 transfers data to the LPDD 312 and retrieves data from the LPDD 312 in step 368. In step 370, control turns off the HPDD 310 when the transfer of the data to the LPDD 312 is complete.

Figure 7B:
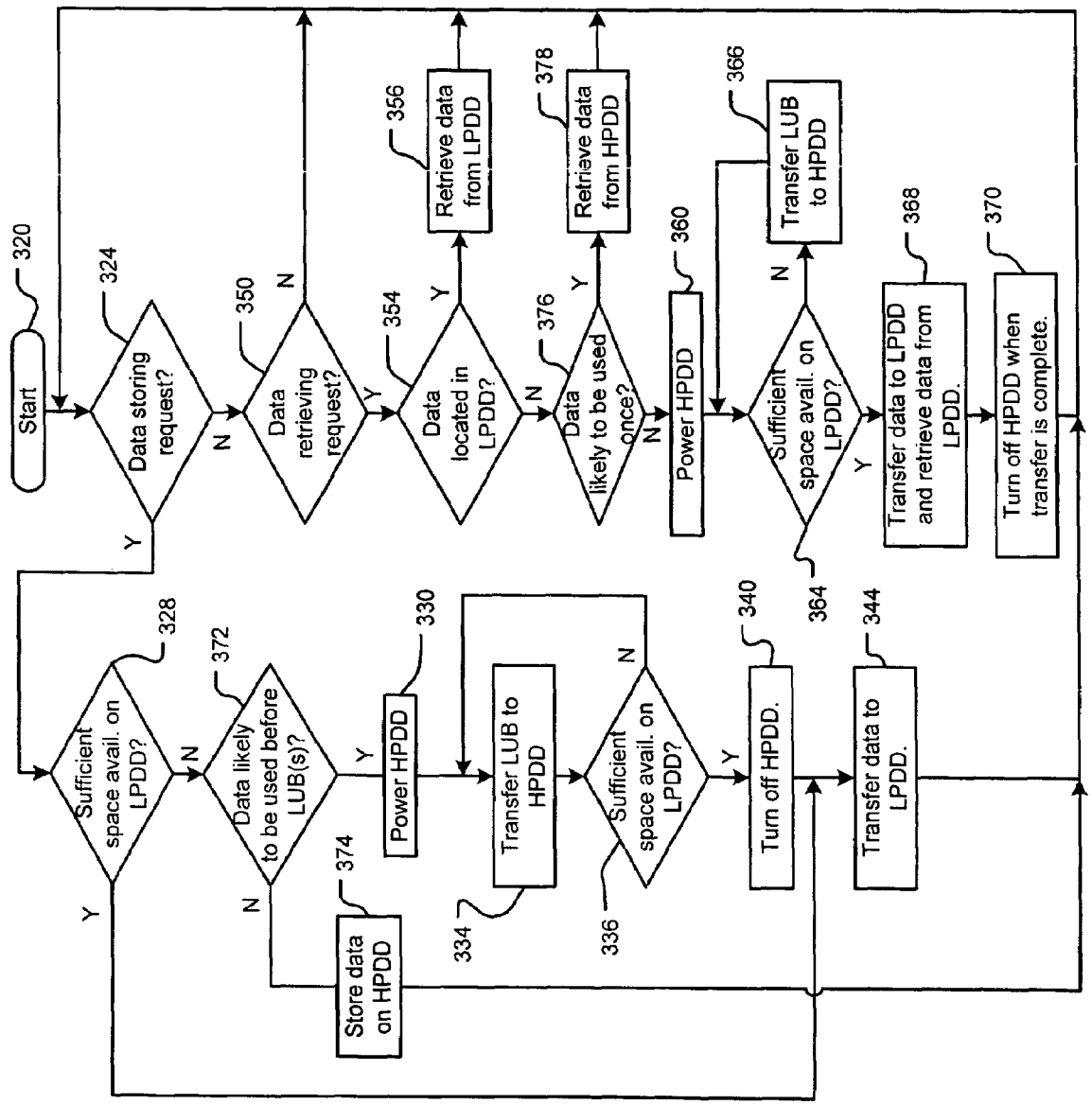
FIG. 7B is a flowchart illustrating alternative steps that are performed by the drive control module of FIG. 6.

Referring now to FIG. 7B, a modified approach that is similar to that shown in FIG. 7A is used and includes one or more adaptive steps performed by the adaptive storage module 306. When there is sufficient space available on the LPDD in step 328, control determines whether the data to be stored is likely to be used before the data in the least used block or blocks that are identified by the least used block module in step 372. If step 372 is false, the drive control module 300 stores the data on the HPDD in step 374 and control continues with step 324. By doing so, the power that is consumed to transfer the least used block(s) to the LPDD is saved. If step 372 is true, control continues with step 330 as described above with respect to FIG. 7A.

When step 354 is false during a data retrieval request, control continues with step 376 and determines whether data is likely to be used once. If step 376 is true, the drive control module 300 retrieves the data from the HPDD in step 378 and continues with step 324. By doing so, the power that would be consumed to transfer the data to the LPDD is saved. If step 376 is false, control continues with step 360. As can be appreciated, if the data is likely to be used once, there is no need to move the data to the LPDD. The power dissipation of the HPDD, however, cannot be avoided.

Figure 7D:
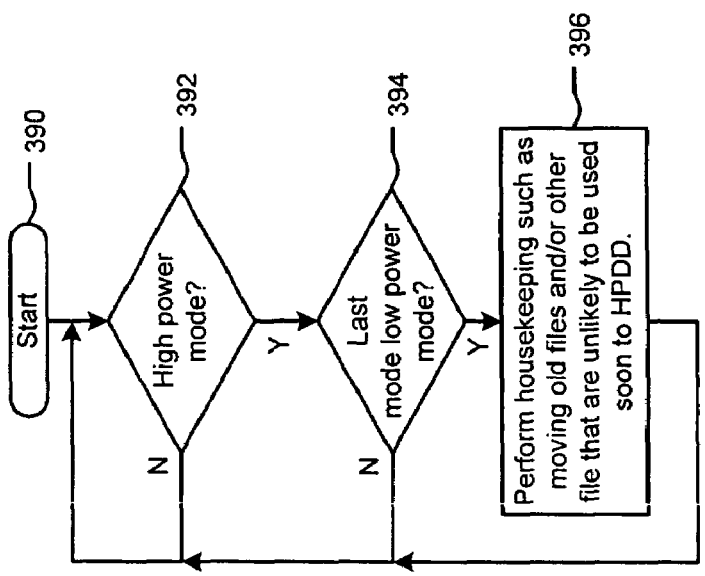
FIGS. 7C and 7D are flowcharts illustrating alternative steps that are performed by the drive control module of FIG. 6.
Figure 7C:
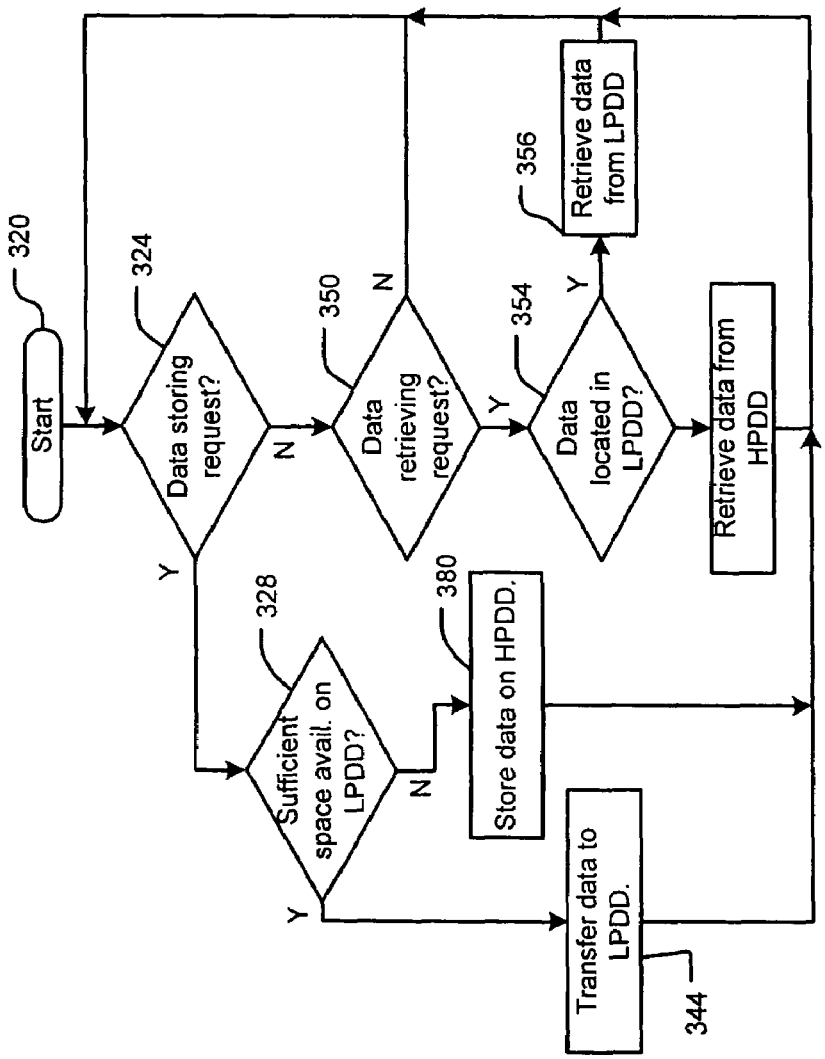

Referring now to FIG. 7C, a more simplified form of control can also be performed during low power operation. Maintenance steps can also be performed during high power and/or low power modes (using the LPDD maintenance module 308). In step 328, when there is sufficient space available on the LPDD, the data is transferred to the LPDD in step 344 and control returns to step 324. Otherwise, when step 328 is false, the data is stored on the HPDD in step 380 and control returns to step 324. As can be appreciated, the approach illustrated in FIG. 7C uses the LPDD when capacity is available and uses the HPDD when LPDD capacity is not available. Skilled artisans will appreciate that hybrid methods may be employed using various combinations of the steps of FIGS. 7A-7D.

In FIG. 7D, maintenance steps are performed by the drive control module 300 upon returning to the high power mode and/or at other times to delete unused or low use files that are stored on the LPDD. This maintenance step can also be performed in the low power mode, periodically during use, upon the occurrence of an event such as a disk full event, and/or in other situations. Control begins in step 390. In step 392, control determines whether the high power mode is in use. If not, control loops back to step 7D. If step 392 is true, control determines whether the last mode was the low power mode in step 394. If not, control returns to step 392. If step 394 is false, control performs maintenance such as moving aged or low use files from the LPDD to the HPDD in step 396. Adaptive decisions may also be made as to which files are likely to be used in the future, for example using criteria described above and below in conjunction with FIGS. 8A-10.

Referring now to FIGS. 8A and 8B, storage control systems 400-1, 400-2 and 400-3 are shown. In FIG. 8A, the storage control system 400-1 includes a cache control module 410 with an adaptive storage control module 414. The adaptive storage control module 414 monitors usage of files and/or programs to determine whether they are likely to be used in the low power mode or the high power mode. The cache control module 410 communicates with one or more data buses 416, which in turn, communicate with volatile memory 422 such as L1 cache, L2 cache, volatile RAM such as DRAM and/or other volatile electronic data storage. The buses 416 also communicate with low power nonvolatile memory 424 (such as Flash memory and/or a LPDD) and/or high power nonvolatile memory 426 such as a HPDD 426. In FIG. 8B, a full-featured and/or restricted feature operating system 430 is shown to include the adaptive storage control module 414. Suitable interfaces and/or controllers (not shown) are located between the data bus and the HPDD and/or LPDD.

Figure 8C:
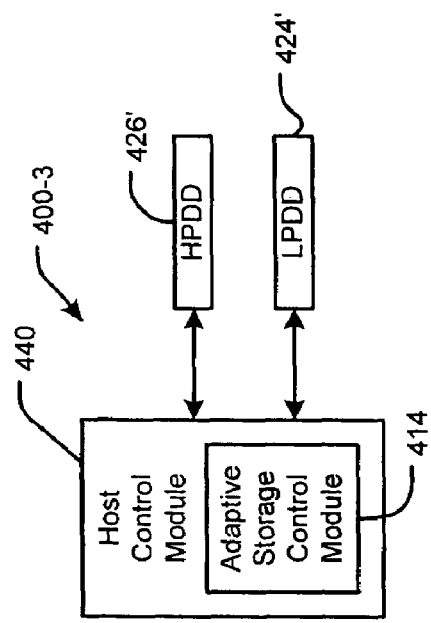
FIG. 8C illustrates a host control module that includes an adaptive storage control module and that controls storage and transfer of data between the LPDD and HPDD.

In FIG. 8C, a host control module 440 includes the adaptive storage control module 414. The host control module 440 communicates with a LPDD 426' and a hard disk drive 426'. The host control module 440 can be a drive control module, an Integrated Device Electronics (IDE), ATA, serial ATA (SATA) or other controller.

Figure 9:
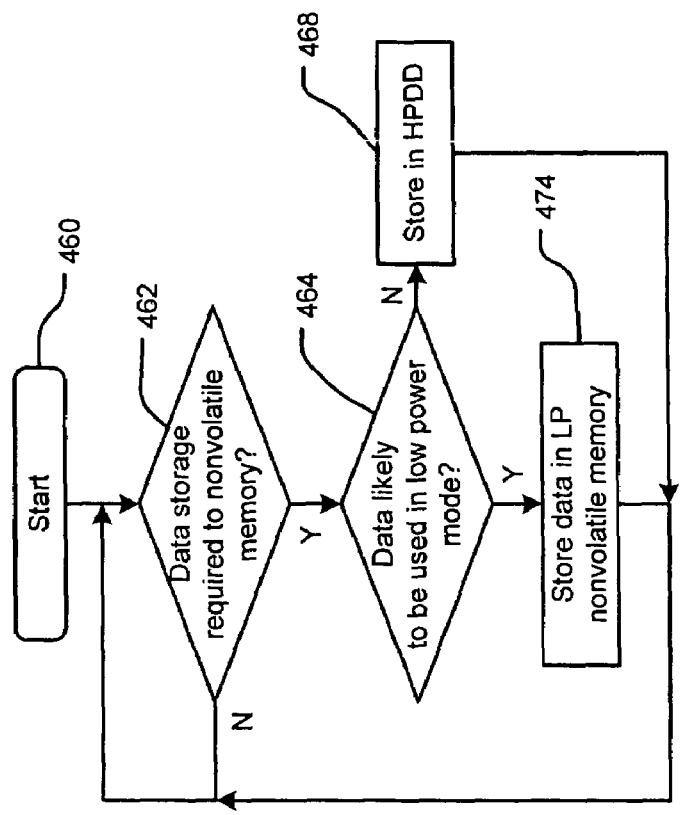
FIG. 9 illustrates steps performed by the adaptive storage control modules of FIGS. 8A-8C.

Referring now to FIG. 9, steps performed by the storage control systems in FIGS. 8A-8C are shown. In FIG. 9, control begins with step 460. In step 462, control determines whether there is a request for data storage to nonvolatile memory. If not, control loops back to step 462. Otherwise, the adaptive storage control module 414 determines whether data is likely to be used in the low-power mode in step 464. If step 464 is false, data is stored in the HPDD in step 468. If step 464 is true, the data is stored in the nonvolatile memory 444 in step 474.

Referring now to FIG. 10, one way of determining whether a data block is likely to be used in the low-power mode is shown. A table 490 includes a data block descriptor field 492, a low-power counter field 493, a high-power counter field 494, a size field 495, a last use field 496 and/or a manual override field 497. When a particular program or file is used during the low-power or high-power modes, the counter field 493 and/or 494 is incremented. When data storage of the program or file is required to nonvolatile memory, the table 492 is accessed. A threshold percentage and/or count value may be used for evaluation. For example, if a file or program is used greater than 80 percent of the time in the low-power mode, the file may be stored in the low-power nonvolatile memory such as flash memory and/or the microdrive. If the threshold is not met, the file or program is stored in the high-power nonvolatile memory.

As can be appreciated, the counters can be reset periodically, after a predetermined number of samples (in other words to provide a rolling window), and/or using any other criteria. Furthermore, the likelihood may be weighted, otherwise modified, and/or replaced by the size field 495. In other words, as the file size grows, the required threshold may be increased because of the limited capacity of the LPDD.

Further modification of the likelihood of use decision may be made on the basis of the time since the file was last used as recorded by the last use field 496. A threshold date may be used and/or the time since last use may be used as one factor in the likelihood determination. While a table is shown in FIG. 10, one or more of the fields that are used may be stored in other locations and/or in other data structures. An algorithm and/or weighted sampling of two or more fields may be used.

Using the manual override field 497 allows a user and/or the operating system to manually override of the likelihood of use determination. For example, the manual override field may allow an L status for default storage in the LPDD, an H status for default storage in the HPDD and/or an A status for automatic storage decisions (as described above). Other manual override classifications may be defined. In addition to the above criteria, the current power level of the computer operating in the LPDD may be used to adjust the decision. Skilled artisans will appreciate that there are other methods for determining the likelihood that a file or program will be used in the high-power or low-power modes that fall within the teachings of the present invention.

Figure 11B:
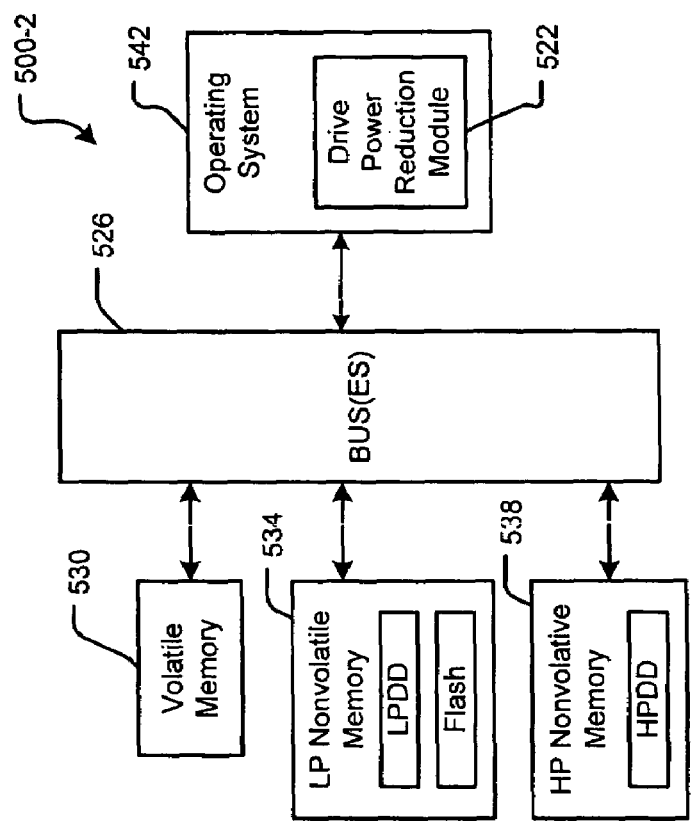
FIG. 11B illustrates an operating system that includes a disk drive power reduction module.
Figure 11A:
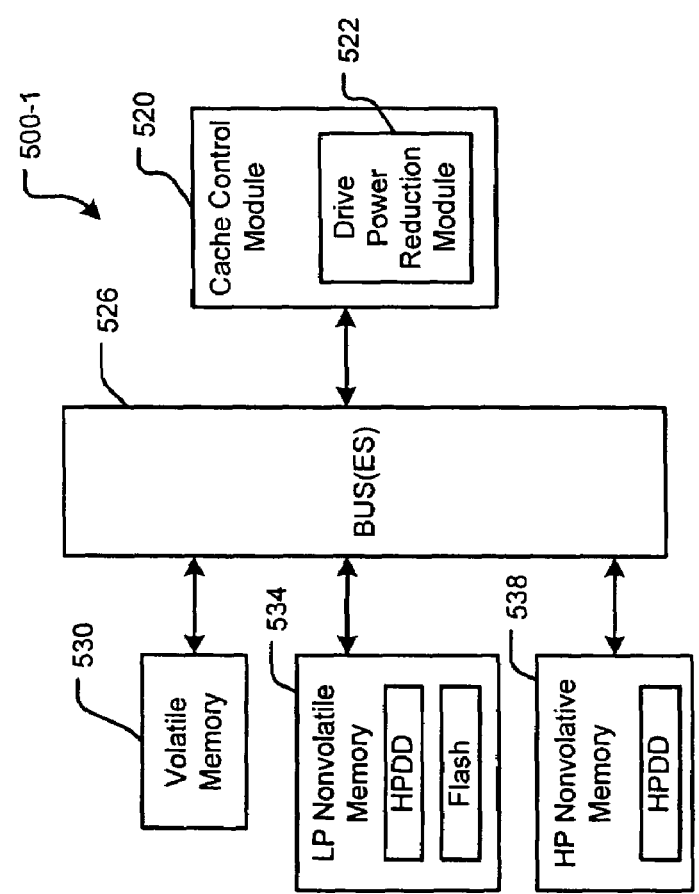
FIG. 11A illustrates a cache control module that includes a disk drive power reduction module.

Referring now to FIGS. 11A and 11B, drive power reduction systems 500-1, 500-2 and 500-3 (collectively 500) are shown. The drive power reduction system 500 bursts segments of a larger sequential access file such as but not limited audio and/or video files to the low power nonvolatile memory on a periodic or other basis. In FIG. 11A, the drive power reduction system 500-1 includes a cache control module 520 with a drive power reduction control module 522. The cache control module 520 communicates with one or more data buses 526, which in turn, communicate with volatile memory 530 such as L1 cache, L2 cache, volatile RAM such as DRAM and/or other volatile electronic data storage, nonvolatile memory 534 such as Flash memory and/or a LPDD, and a HPDD 538. In FIG. 11B, the drive power reduction system 500-2 includes a full-featured and/or restricted feature operating system 542 with a drive power reduction control module 522. Suitable interfaces and/or controllers (not shown) are located between the data bus and the HPDD and/or LPDD.

Figure 11C:
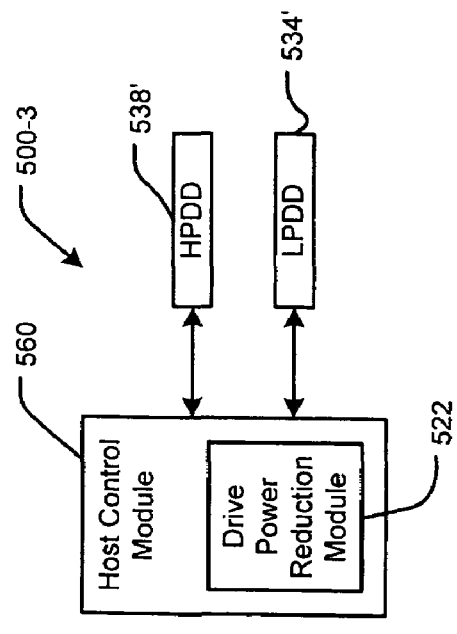
FIG. 11C illustrates a host control module that includes a disk drive power reduction module.

In FIG. 11C, the drive power reduction system 500-3 includes a host control module 560 with an adaptive storage control module 522. The host control module 560 communicates with one or more data buses 564, which communicate with the LPDD 534' and the hard disk drive 538'. The host control module 560 can be a drive control module, an Integrated Device Electronics (IDE), ATA, serial ATA (SATA) and/or other controller or interface.

Referring now to FIG. 12, steps performed by the drive power reduction systems 500 in FIGS. 11A-11C are shown. Control begins the step 582. In step 584, control determines whether the system is in a low-power mode. If not, control loops back to step 584. If step 586 is true, control continues with step 586 where control determines whether a large data block access is typically requested from the HPDD in step 586. If not, control loops back to step 584. If step 586 is true, control continues with step 590 and determines whether the data block is accessed sequentially. If not, control loops back to 584. If step 590 is true; control continues with step 594 and determines the playback length. In step 598, control determines a burst period and frequency for data transfer from the high power nonvolatile memory to the low power nonvolatile memory.

In one implementation, the burst period and frequency are optimized to reduce power consumption. The burst period and frequency are preferably based upon the spin-up time of the HPDD and/or the LPDD, the capacity of the nonvolatile memory, the playback rate, the spin-up and steady state power consumption of the HPDD and/or LPDD, and/or the playback length of the sequential data block.

For example, the high power nonvolatile memory is a HPDD that consumes 1-2W during operation, has a spin-up time of 4-10 seconds and a capacity that is typically greater than 20 Gb. The low power nonvolatile memory is a microdrive that consumes 0.3-0.5W during operation, has a spin-up time of 1-3 seconds, and a capacity of 1-6 Gb. As can be appreciated, the forgoing performance values and/or capacities will vary for other implementations. The HPDD may have a data transfer rate of 1 Gb/s to the microdrive. The playback rate may be 10 Mb/s (for example for video files). As can be appreciated, the burst period times the transfer rate of the HPDD should not exceed the capacity of the microdrive. The period between bursts should be greater than the spin-up time plus the burst period. Within these parameters, the power consumption of the system can be optimized. In the low power mode, if the HPDD is operated to play an entire video such as a movie, a significant amount of power is consumed. Using the method described above, the power dissipation can be reduced significantly by selectively transferring the data from the HPDD to the LPDD in multiple burst segments spaced at fixed intervals at a very high rate (e.g., 100× the playback rate) and then the HPDD can be shut down. Power savings that are greater than 50% can easily be achieved.

Figure 13:
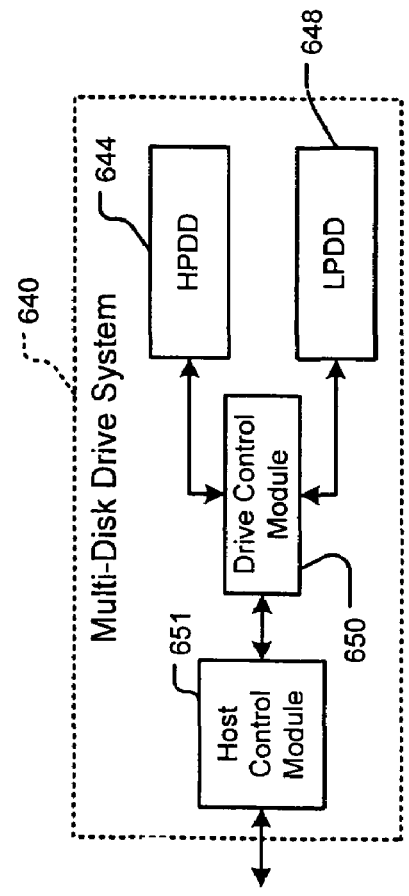
FIG. 13 illustrates a multi-disk drive system including a high-power disk drive (HPDD) and a lower power disk drive (LPDD)

Referring now to FIG. 13, a multi-disk drive system 640 according to the present invention is shown to include a drive control module 650 and one or more HPDD 644 and one or more LPDD 648. The drive control module 650 communicates with a host device via host control module 651. To the host, the multi-disk drive system 640 effectively operates the HPDD 644 and LPDD 648 as a unitary disk drive to reduce complexity, improve performance and decrease power consumption, as will be described below. The host control module 651 can be an IDE, ATA, SATA and/or other control module or interface.

Figure 14:
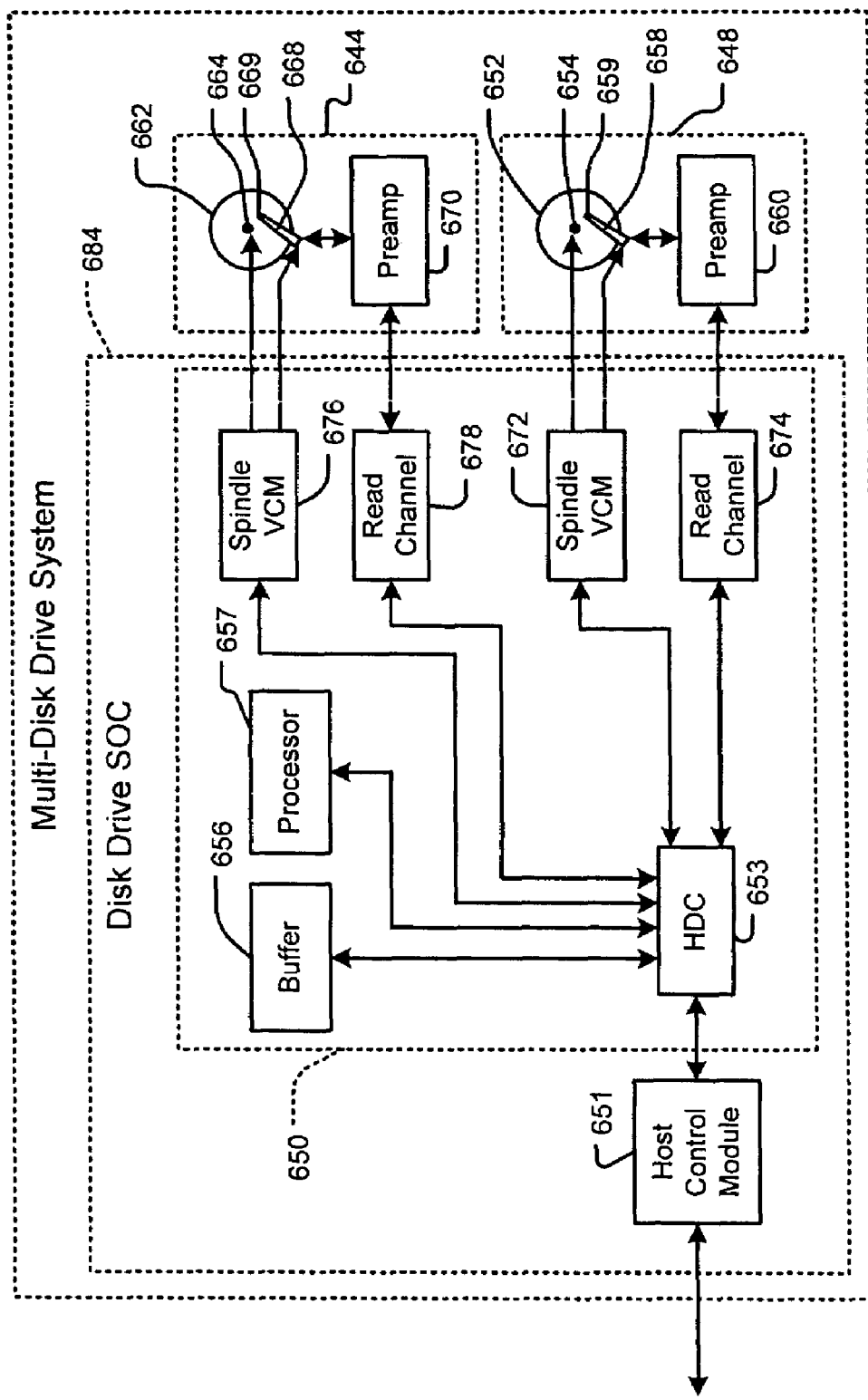
FIGS. 14-17 illustrate other exemplary implementations of the multi-disk drive system of FIG. 13.

Referring now to FIG. 14, in one implementation the drive control module 650 includes a hard disk controller (HDC) 653 that is used to control one or both of the LPDD and/or HPDD. A buffer 656 stores data that is associated the control of the HPDD and/or LPDD and/or aggressively buffers data to/from the HPDD and/or LPDD to increase data transfer rates by optimizing data block sizes. A processor 657 performs processing that is related to the operation of the HPDD and/or LPDD.

The HPDD 648 includes one or more platters 652 having a magnetic coating that stores magnetic fields. The platters 652 are rotated by a spindle motor that is schematically shown at 654. Generally the spindle motor 654 rotates the platter 652 at a fixed speed during the read/write operations. One or more read/write arms 658 move relative to the platters 652 to read and/or write data to/from the platters 652. Since the HPDD 648 has larger platters than the LPDD, more power is required by the spindle motor 654 to spin-up the HPDD and to maintain the HPDD at speed. Usually, the spin-up time is higher for HPDD as well.

A read/write device 659 is located near a distal end of the read/write arm 658. The read/write device 659 includes a write element such as an inductor that generates a magnetic field. The read/write device 659 also includes a read element (such as a magneto-resistive (MR) element) that senses the magnetic field on the platter 652. A preamp circuit 660 amplifies analog read/write signals.

When reading data, the preamp circuit 660 amplifies low level signals from the read element and outputs the amplified signal to the read/write channel device. While writing data, a write current is generated which flows through the write element of the read/write device 659 and is switched to produce a magnetic field having a positive or negative polarity. The positive or negative polarity is stored by the platter 652 and is used to represent data. The LPDD 644 also includes one or more platters 662, a spindle motor 664, one or more read/write arms 668, a read/write device 669, and a preamp circuit 670.

The HDC 653 communicates with the host control module 651 and with a first spindle/voice coil motor (VCM) driver 672, a first read/write channel circuit 674, a second spindle/VCM driver 676, and a second read/write channel circuit 678. The host control module 651 and the drive control module 650 can be implemented by a system on chip (SOC) 684. As can be appreciated, the spindle VCM drivers 672 and 676 and/or read/write channel circuits 674 and 678 can be combined. The spindle/VCM drivers 672 and 676 control the spindle motors 654 and 664, which rotate the platters 652 and 662, respectively. The spindle/VCM drivers 672 and 676 also generate control signals that position the read/write arms 658 and 668, respectively, for example using a voice coil actuator, a stepper motor or any other suitable actuator.

Figure 15:
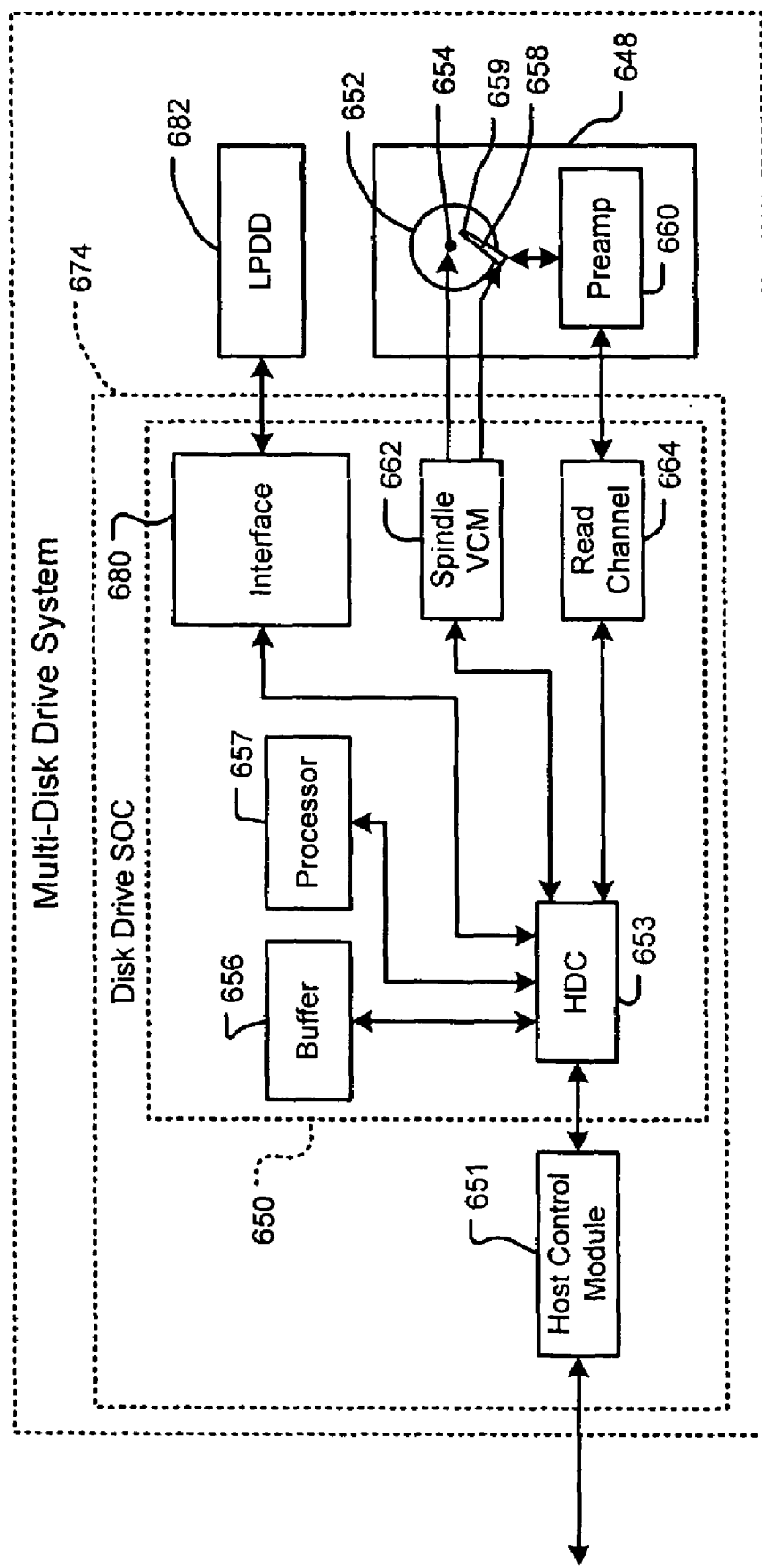
Figure 16:
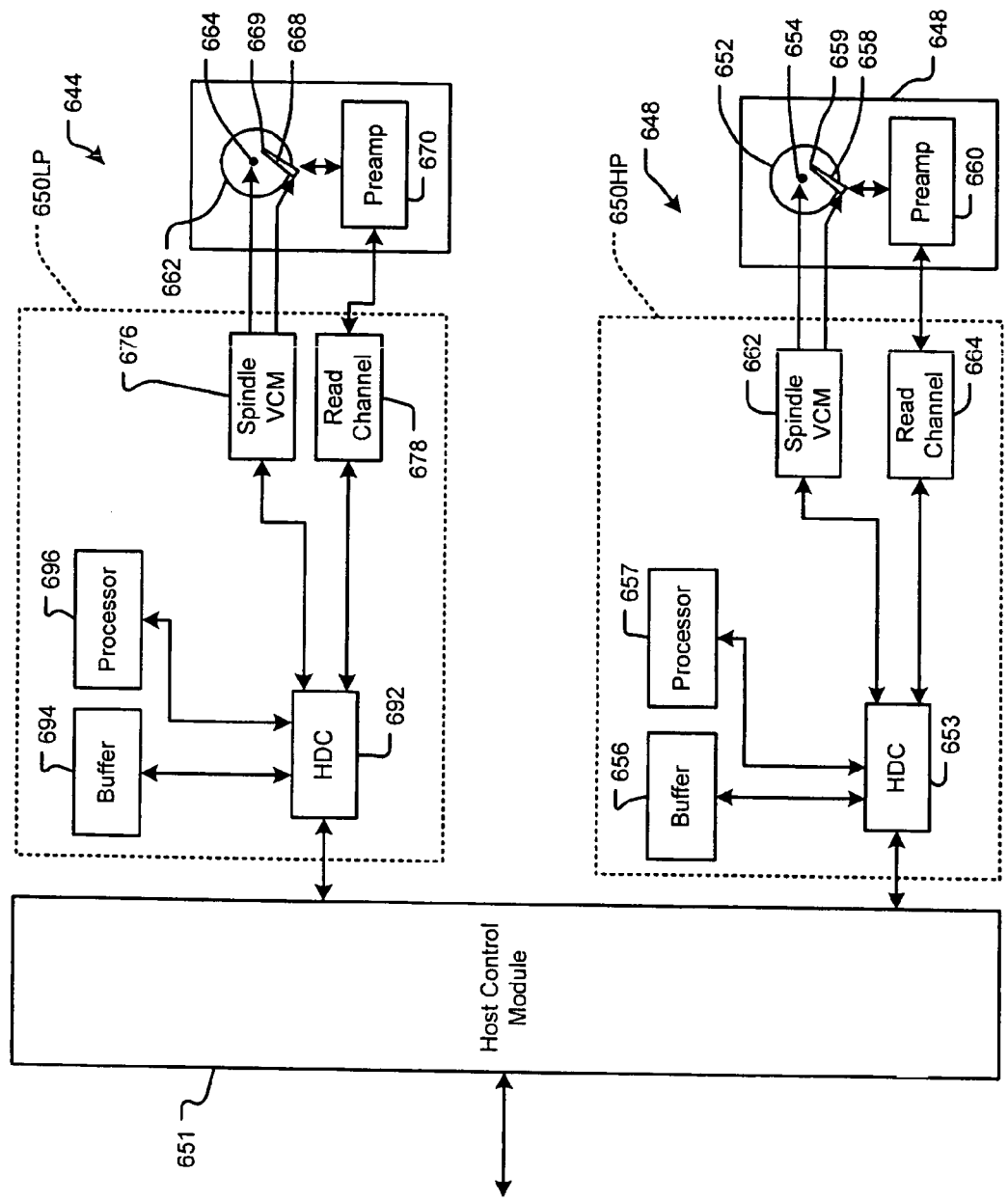
Figure 17:
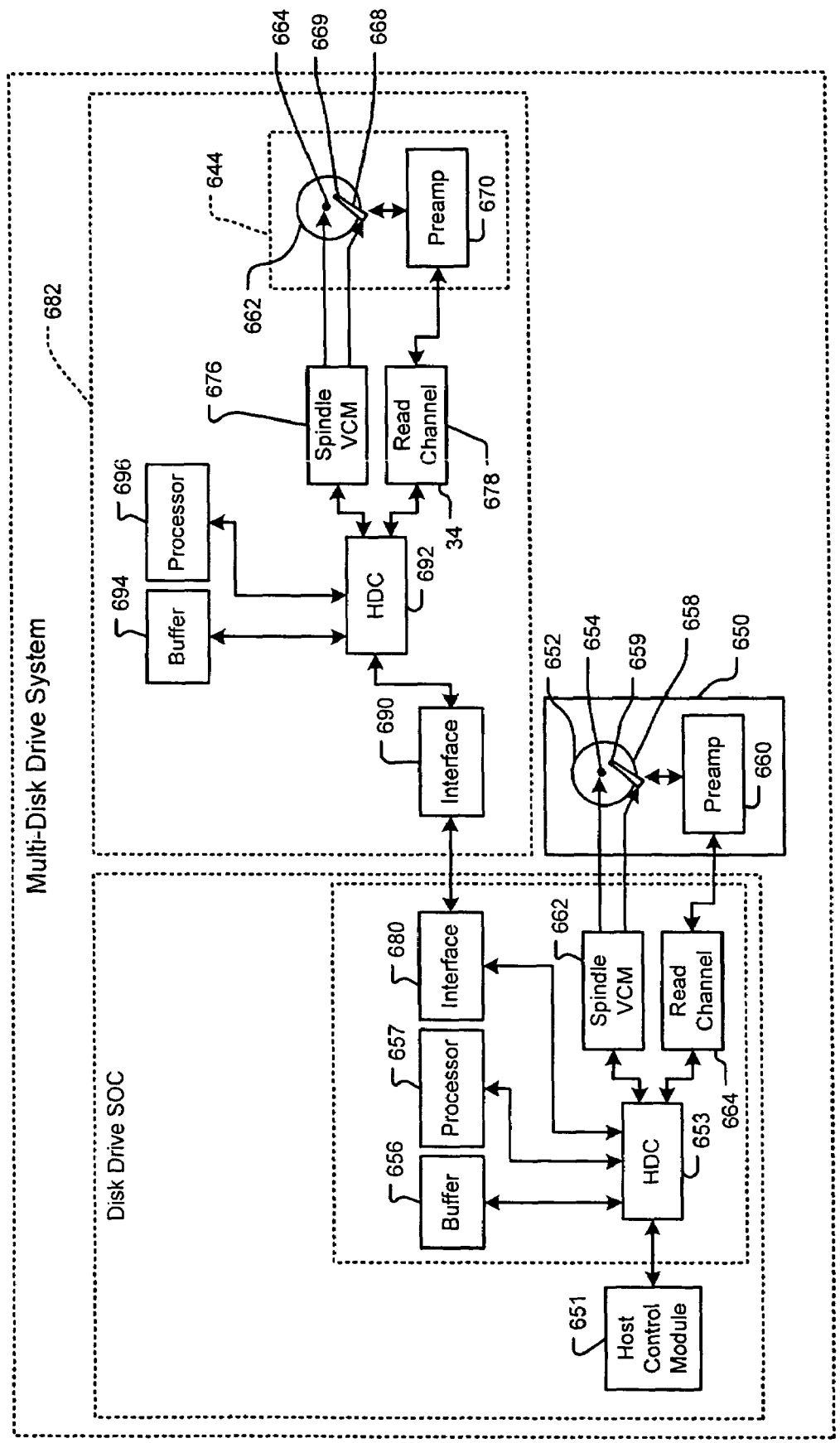

Referring now to FIGS. 15-17, other variations of the multi-disk drive system are shown. In FIG. 15, the drive control module 650 may include a direct interface 680 for providing an external connection to one or more LPDD 682. In one implementation, the direct interface is a Peripheral Component Interconnect (PCI) bus, a PCI Express (PCIX) bus, and/or any other suitable bus or interface.

In FIG. 16, the host control module 651 communicates with both the LPDD 644 and the HPDD 648. A low power drive control module 650LP and a high power disk drive control module 650HP communicate directly with the host control module. Zero, one or both of the LP and/or the HP drive control modules can be implemented as a SOC.

In FIG. 17, one exemplary LPDD 682 is shown to include an interface 690 that supports communications with the direct interface 680. As set forth above, the interfaces 680 and 690 can be a Peripheral Component Interconnect (PCI) bus, a PCI Express (PCIX) bus, and/or any other suitable bus or interface. The LPDD 682 includes an HDC 692, a buffer 694 and/or a processor 696. The LPDD 682 also includes the spindle/VCM driver 676, the read/write channel circuit 678, the platter 662, the spindle motor 665, the read/write arm 668, the read element 669, and the preamp 670, as described above. Alternately, the HDC 653, the buffer 656 and the processor 658 can be combined and used for both drives. Likewise the spindle/VCM driver and read channel circuits can optionally be combined. In the embodiments in FIGS. 13-17, aggressive buffering of the LPDD is used to increase performance. For example, the buffers are used to optimize data block sizes for optimum speed over host data buses.

In conventional computer systems, a paging file is a hidden file on the HPDD or HP nonvolatile memory that is used by the operating system to hold parts of programs and/or data files that do not fit in the volatile memory of the computer. The paging file and physical memory, or RAM, define virtual memory of the computer. The operating system transfers data from the paging file to memory as needed and returns data from the volatile memory to the paging file to make room for new data. The paging file is also called a swap file.

Referring now to FIGS. 18-20, the present invention utilizes the LP nonvolatile memory such as the LPDD and/or flash memory to increase the virtual memory of the computer system. In FIG. 18, an operating system 700 allows a user to define virtual memory 702. During operation, the operating system 700 addresses the virtual memory 702 via one or more buses 704. The virtual memory 702 includes both volatile memory 708 and LP nonvolatile memory 710 such as Flash memory and/or a LPDD.

Referring now to FIG. 19, the operating system allows a user to allocate some or all of the LP nonvolatile memory 710 as paging memory to increase virtual memory. In step 720, control begins. In step 724, the operating system determines whether additional paging memory is requested. If not, control loops back to step 724. Otherwise, the operating system allocates part of the LP nonvolatile memory for paging file use to increase the virtual memory in step 728.

In FIG. 20, the operating system employs the additional LP nonvolatile memory as paging memory. Control begins in step 740. In step 744, control determines whether the operating system is requesting a data write operation. If true, control continues with step 748 and determines whether the capacity of the volatile memory is exceeded. If not, the volatile memory is used for the write operation in step 750. If step 748 is true, data is stored in the paging file in the LP nonvolatile memory in step 754. If step 744 is false, control continues with step 760 and determines whether a data read is requested. If false, control loops back to step 744. Otherwise, control determines whether the address corresponds to a RAM address in step 764. If step 764 is true, control reads data from the volatile memory in step 764 and continues with step 744. If step 764 is false, control reads data from the paging file in the LP nonvolatile memory in step 770 and control continues with step 744.

As can be appreciated, using LP nonvolatile memory such as Flash memory and/or the LPDD to increase the size of virtual memory will increase the performance of the computer as compared to systems employing the HPDD. Furthermore, the power consumption will be lower than systems using the HPDD for the paging file. The HPDD requires additional spin-up time due to its increased size, which increases data access times as compared to the Flash memory, which has no spin-up latency, and/or the LPDD, which has a shorter spin-up time and lower power dissipation.

Figure 21:
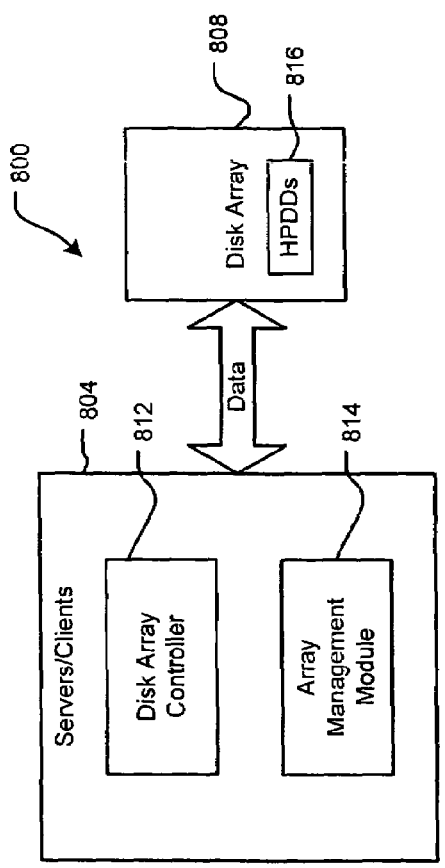
FIG. 21 is a functional block diagram of a Redundant Array of Independent Disks (RAID) system according to the prior art.

Referring now to FIG. 21, a Redundant Array of Independent Disks (RAID) system 800 is shown to include one or more servers and/or clients 804 that communicate with a disk array 808. The one or more servers and/or clients 804 include a disk array controller 812 and/or an array management module 814. The disk array controller 812 and/or the array management module 814 receive data and perform logical to physical address mapping of the data to the disk array 808. The disk array typically includes a plurality of HPDD 816.

The multiple HPDDs 816 provide fault tolerance (redundancy) and/or improved data access rates. The RAID system 800 provides a method of accessing multiple individual HPDDs as if the disk array 808 is one large hard disk drive. Collectively, the disk array 808 may provide hundreds of Gb to 10's to 100's of Tb of data storage. Data is stored in various ways on the multiple HPDDs 816 to reduce the risk of losing all of the data if one drive fails and to improve data access time.

The method of storing the data on the HPDDs 816 is typically called a RAID level. There are various RAID levels including RAID level 0 or disk striping. In RAID level 0 systems, data is written in blocks across multiple drives to allow one drive to write or read a data block while the next is seeking the next block. The advantages of disk striping include the higher access rate and full utilization of the array capacity. The disadvantage is there is no fault tolerance. If one drive fails, the entire contents of the array become inaccessible.

RAID level 1 or disk mirroring provides redundancy by writing twice—once to each drive. If one drive fails, the other contains an exact duplicate of the data and the RAID system can switch to using the mirror drive with no lapse in user accessibility. The disadvantages include a lack of improvement in data access speed and higher cost due to the increased number of drives (2N) that are required. However, RAID level 1 provides the best protection of data since the array management software will simply direct all application requests to the surviving HPDDs when one of the HPDDs fails.

RAID level 3 stripes data across multiple drives with an additional drive dedicated to parity, for error correction/recovery. RAID level 5 provides striping as well as parity for error recovery. In RAID level 5, the parity block is distributed among the drives of the array, which provides more balanced access load across the drives. The parity information is used to recovery data if one drive fails. The disadvantage is a relatively slow write cycle (2 reads and 2 writes are required for each block written). The array capacity is N−1, with a minimum of 3 drives required.

RAID level 0+1 involves stripping and mirroring without parity. The advantages are fast data access (like RAID level 0), and single drive fault tolerance (like RAID level 1). RAID level 0+1 still requires twice the number of disks (like RAID level 1). As can be appreciated, there can be other RAID levels and/or methods for storing the data on the array 808.

Figure 22A:
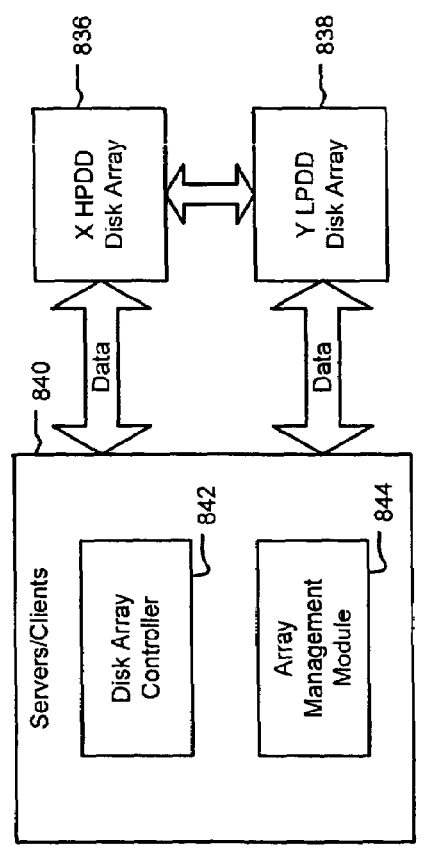
FIG. 22A is a functional block diagram of an exemplary RAID system according to the present invention with a disk array including X HPDD and a disk array including Y LPDD.
Figure 22B:
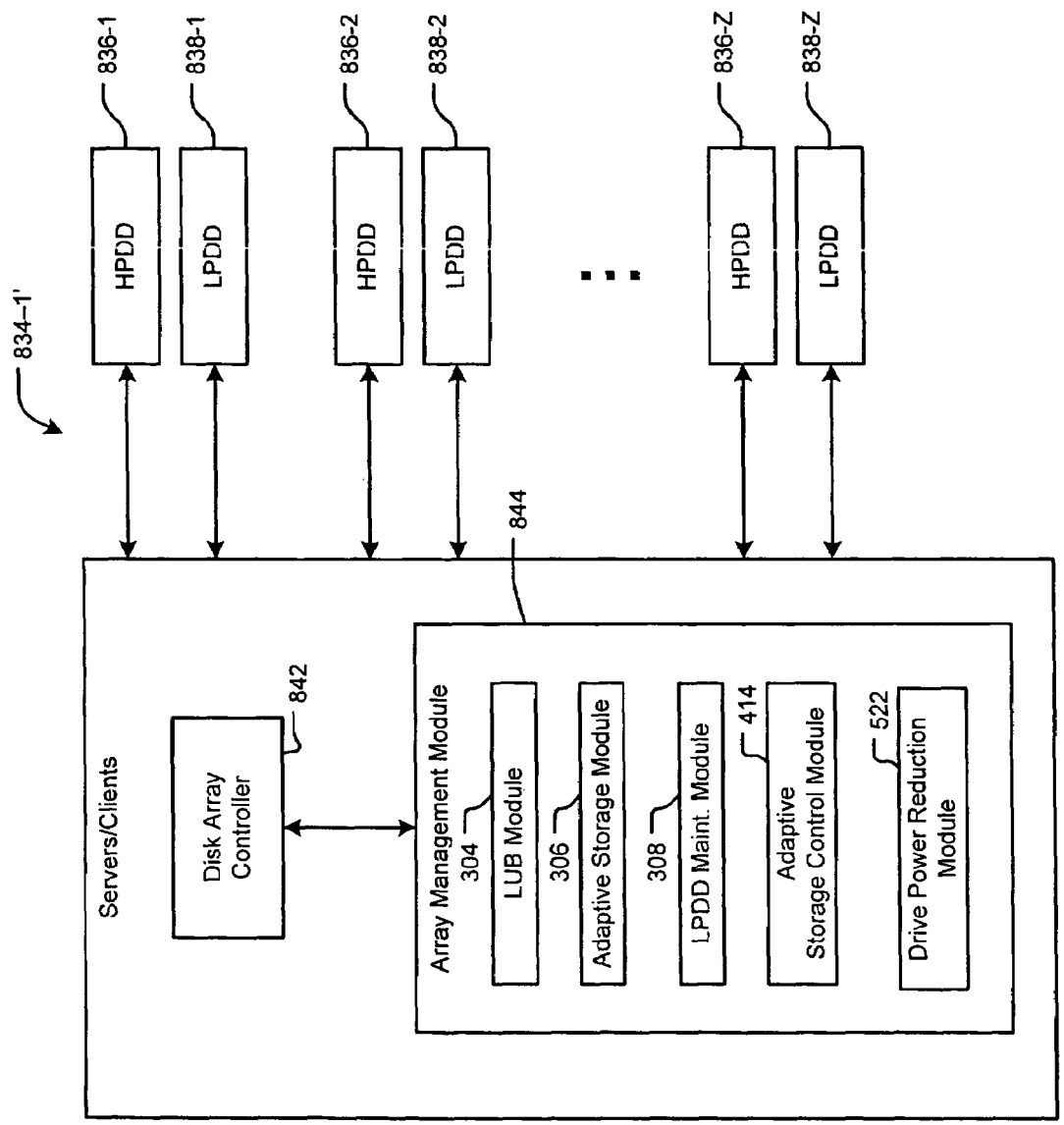
FIG. 22B is a functional block diagram of the RAID system of FIG. 22A where X and Y are equal to Z.

Referring now to FIGS. 22A and 22B, a RAID system 834-1 according to the present invention includes a disk array 836 that includes X HPDD and a disk array 838 that includes Y LPDD. One or more clients and/or a servers 840 include a disk array controller 842 and/or an array management module 844. While separate devices 842 and 844 are shown, these devices can be integrated if desired. As can be appreciated, X is greater than or equal to 2 and Y is greater than or equal to 1. X can be greater than Y, less than Y and/or equal to Y. For example, FIG. 22B shows a RAID system 834-1' where X=Y=Z.

Figure 23A:
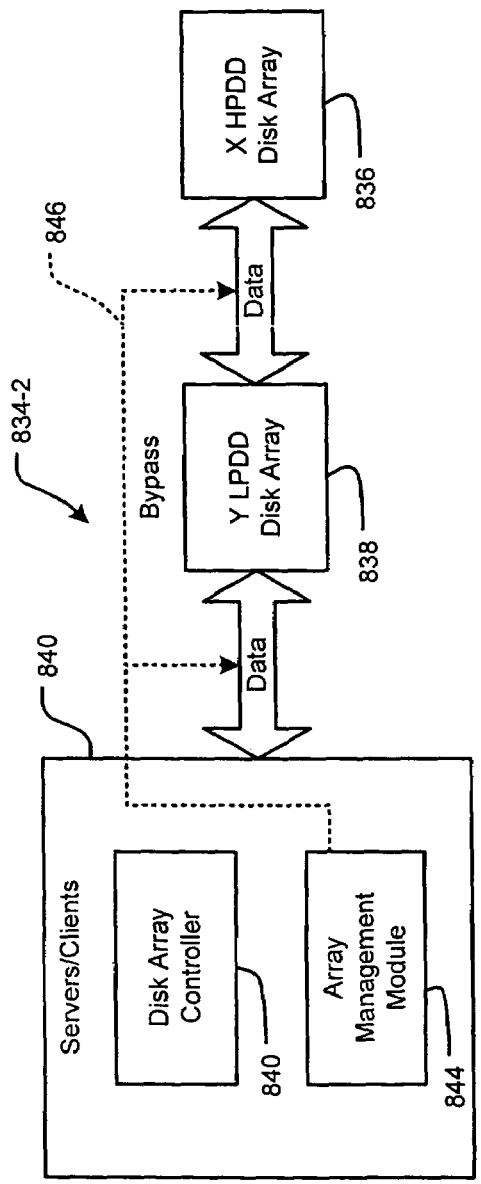
FIG. 23A is a functional block diagram of another exemplary RAID system according to the present invention with a disk array including Y LPDD that communicates with a disk array including X HPDD.
Figure 24A:
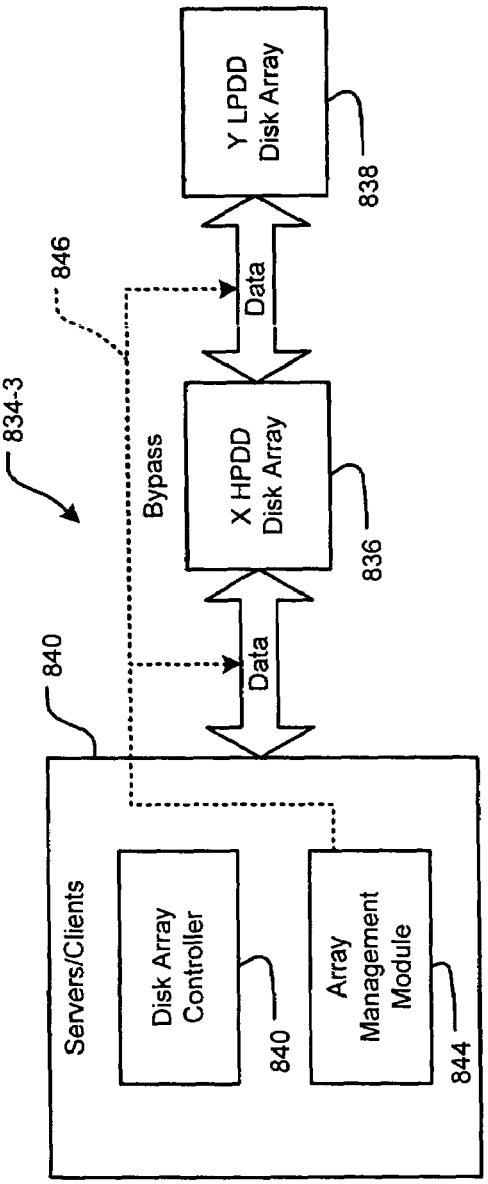
FIG. 24A is a functional block diagram of still another exemplary RAID system according to the present invention with a disk array including X HPDD that communicate with a disk array including Y LPDD.
Figure 23B:
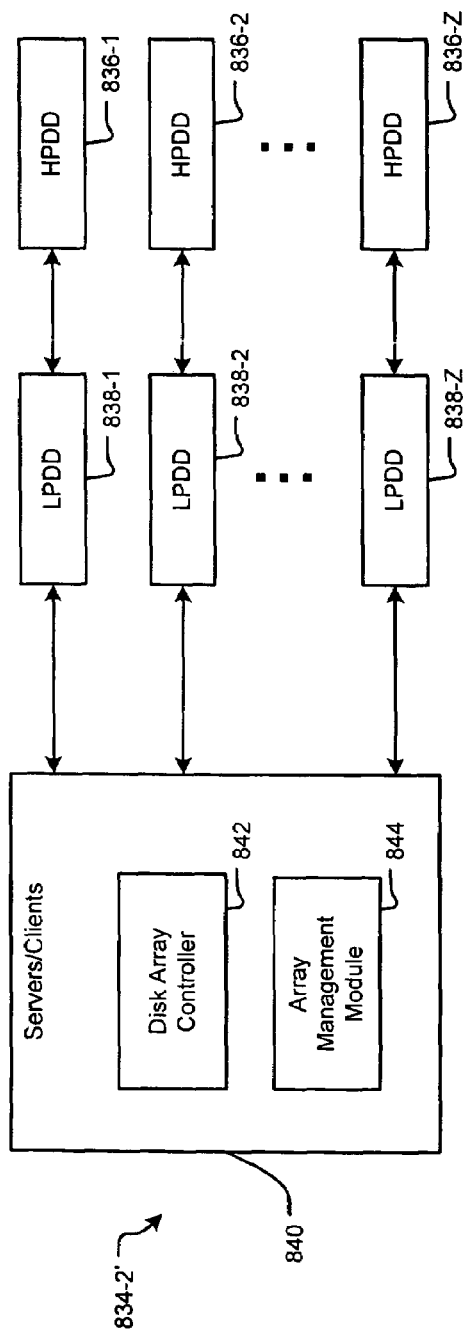
FIG. 23B is a functional block diagram of the RAID system of FIG. 23A where X and Y are equal to Z.
Figure 24B:
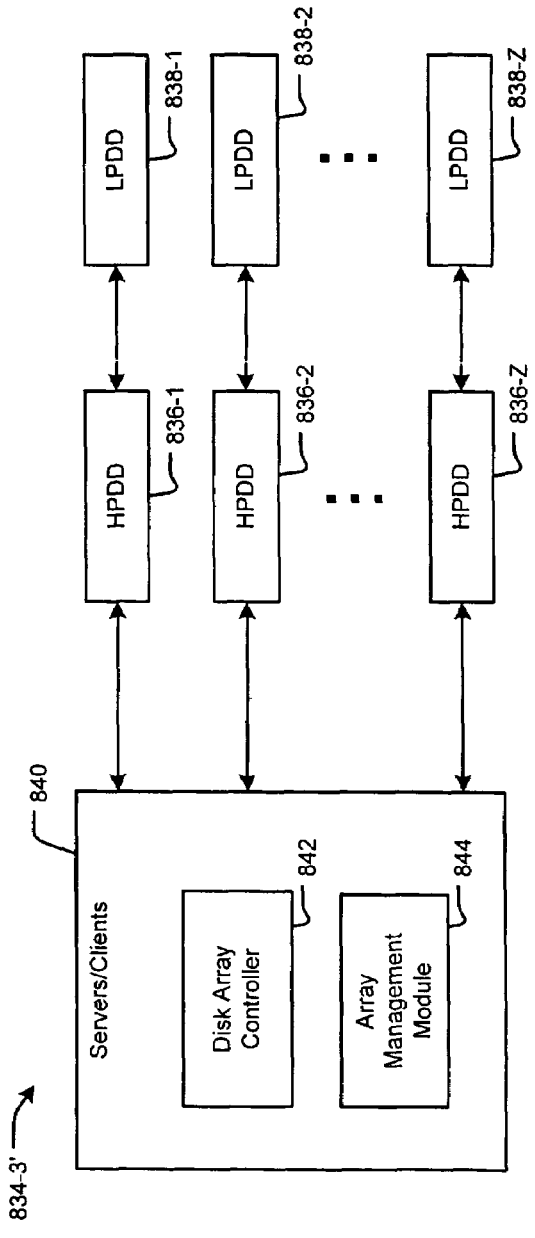
FIG. 24B is a functional block diagram of the RAID system of FIG. 24A where X and Y are equal to Z.

Referring now to FIGS. 23A, 23B, 24A and 24B, RAID systems 834-2 and 834-3 are shown. In FIG. 23A, the LPDD disk array 838 communicates with the servers/clients 840 and the HPDD disk array 836 communicates with the LPDD disk array 838. The RAID system 834-2 may include a management bypass path that selectively circumvents the LPDD disk array 838. As can be appreciated, X is greater than or equal to 2 and Y is greater than or equal to 1. X can be greater than Y, less than Y and/or equal to Y. For example, FIG. 23B shows a RAID system 834-2' where X=Y=Z. In FIG. 24A, the HPDD disk array 836 communicates with the servers/clients 840 and the LPDD disk array 838 communicates with the HPDD disk array 836. The RAID system 834-2 may include a management bypass path shown by dotted line 846 that selectively circumvents the LPDD disk array 838. As can be appreciated, X is greater than or equal to 2 and Y is greater than or equal to 1. X can be greater than Y, less than Y and/or equal to Y. For example, FIG. 24B shows a RAID system 834-3' where X=Y=Z. The strategy employed may include write through and/or write back in FIGS. 23A-24B.

The array management module 844 and/or the disk controller 842 utilizes the LPDD disk array 838 to reduce power consumption of the HPDD disk array 836. Typically, the HPDD disk array 808 in the conventional RAID system in FIG. 21 is kept on at all times during operation to support the required data access times. As can be appreciated, the HPDD disk array 808 dissipates a relatively high amount of power. Furthermore, since a large amount of data is stored in the HPDD disk array 808, the platters of the HPDDs are typically as large as possible, which requires higher capacity spindle motors and increases the data access times since the read/write arms move further on average.

According to the present invention, the techniques that are described above in conjunction with FIGS. 6-17 are selectively employed in the RAID system 834 as shown in FIG. 22B to reduce power consumption and data access times.

While not shown in FIGS. 22A and 23A-24B, the other RAID systems according to the present invention may also use these techniques. In other words, the LUB module 304, adaptive storage module 306 and/or the LPDD maintenance module that are described in FIGS. 6 and 7A-7D are selectively implemented by the disk array controller 842 and/or the array management controller 844 to selectively store data on the LPDD disk array 838 to reduce power consumption and data access times. The adaptive storage control module 414 that is described in FIGS. 8A-8C, 9 and 10 may also be selectively implemented by the disk array controller 842 and/or the array management controller 844 to reduce power consumption and data access times. The drive power reduction module 522 that is described FIGS. 11A-11C and 12 may also be implemented by the disk array controller 842 and/or the array management controller 844 to reduce power consumption and data access times. Furthermore, the multi-drive systems and/or direct interfaces that are shown in FIGS. 13-17 may be implemented with one or more of the HPDD in the HPDD disk array 836 to increase functionality and to reduce power consumption and access times.

Figure 25:
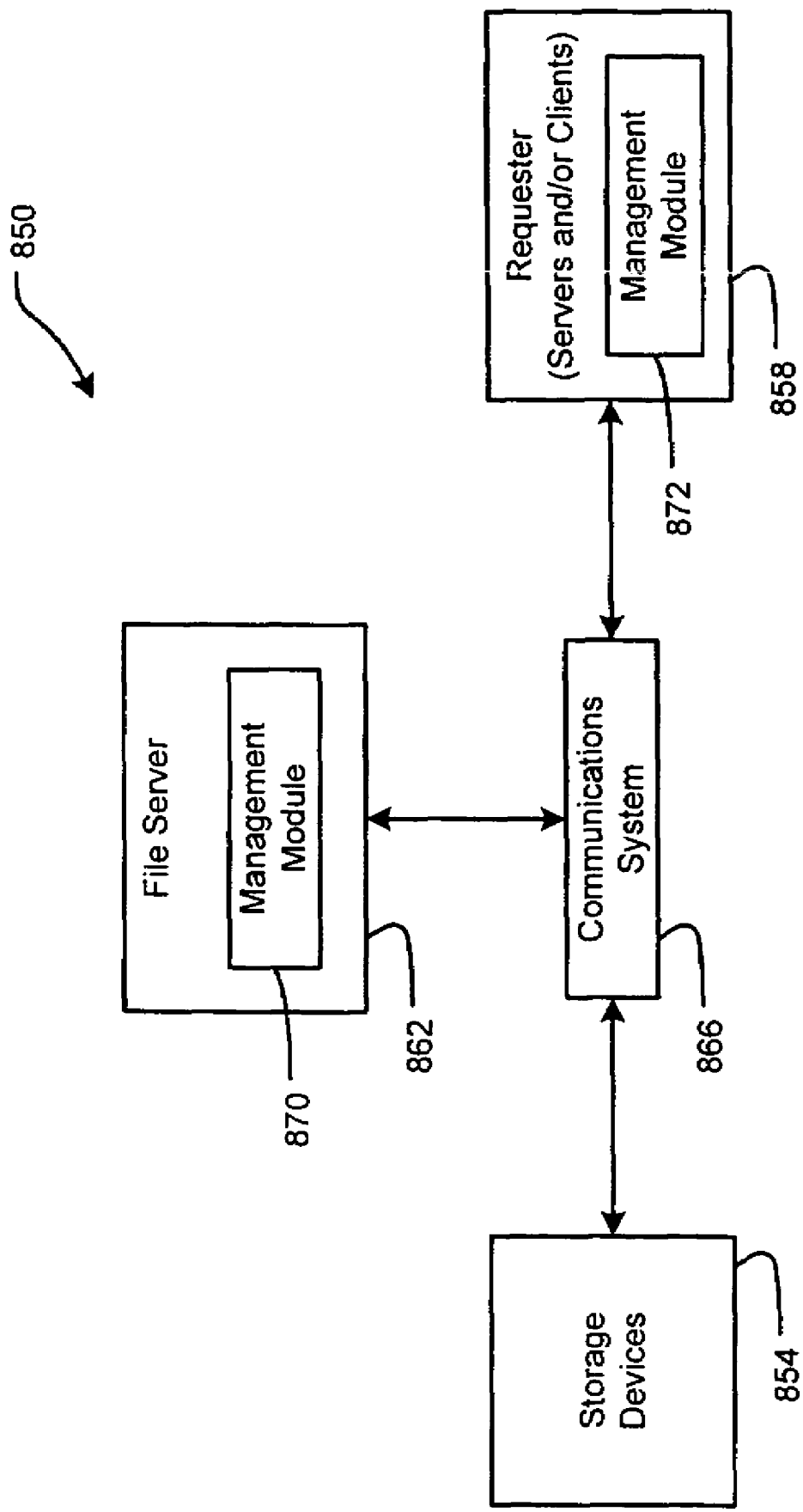
FIG. 25 is a functional block diagram of a network attachable storage (NAS) system according to the prior art.

Referring now to FIG. 25, a network attached storage (NAS) system 850 according to the prior art is shown to include storage devices 854, storage requesters 858, a file server 862, and a communications system 866. The storage devices 854 typically include disc drives, RAID systems, tape drives, tape libraries, optical drives, jukeboxes, and any other storage devices to be shared. The storage devices 854 are preferably but not necessarily object oriented devices. The storage devices 854 may include an I/O interface for data storage and retrieval by the requesters 858. The requesters 858 typically include servers and/or clients that share and/or directly access the storage devices 854.

The file server 862 performs management and security functions such as request authentication and resource location. The storage devices 854 depend on the file server 862 for management direction, while the requesters 858 are relieved of storage management to the extent the file server 862 assumes that responsibility. In smaller systems, a dedicated file server may not be desirable. In this situation, a requester may take on the responsibility for overseeing the operation of the NAS system 850. As such, both the file server 862 and the requester 858 are shown to include management modules 870 and 872, respectively, though one or the other and/or both may be provided. The communications system 866 is the physical infrastructure through which components of the NAS system 850 communicate. It preferably has properties of both networks and channels, has the ability to connect all components in the networks and the low latency that is typically found in a channel.

When the NAS system 850 is powered up, the storage devices 854 identify themselves either to each other or to a common point of reference, such as the file server 862, one or more of the requesters 858 and/or to the communications system 866. The communications system 866 typically offers network management techniques to be used for this, which are accessible by connecting to a medium associated with the communications system. The storage devices 854 and requesters 858 log onto the medium. Any component wanting to determine the operating configuration can use medium services to identify all other components. From the file server 862, the requesters 858 learn of the existence of the storage devices 854 they could have access to, while the storage devices 854 learn where to go when they need to locate another device or invoke a management service like backup. Similarly the file server 862 can learn of the existence of storage devices 854 from the medium services. Depending on the security of a particular installation, a requester may be denied access to some equipment. From the set of accessible storage devices, it can then identify the files, databases, and free space available.

At the same time, each NAS component can identify to the file server 862 any special considerations it would like known. Any device level service attributes could be communicated once to the file server 862, where all other components could learn of them. For instance, a requester may wish to be informed of the introduction of additional storage subsequent to startup, this being triggered by an attribute set when the requester logs onto the file server 862. The file server 862 could do this automatically whenever new storage devices are added to the configuration, including conveying important characteristics, such as it being RAID 5, mirrored, and so on.

When a requester must open a file, it may be able to go directly to the storage devices 854 or it may have to go to the file server for permission and location information. To what extent the file server 854 controls access to storage is a function of the security requirements of the installation.

Figure 26:
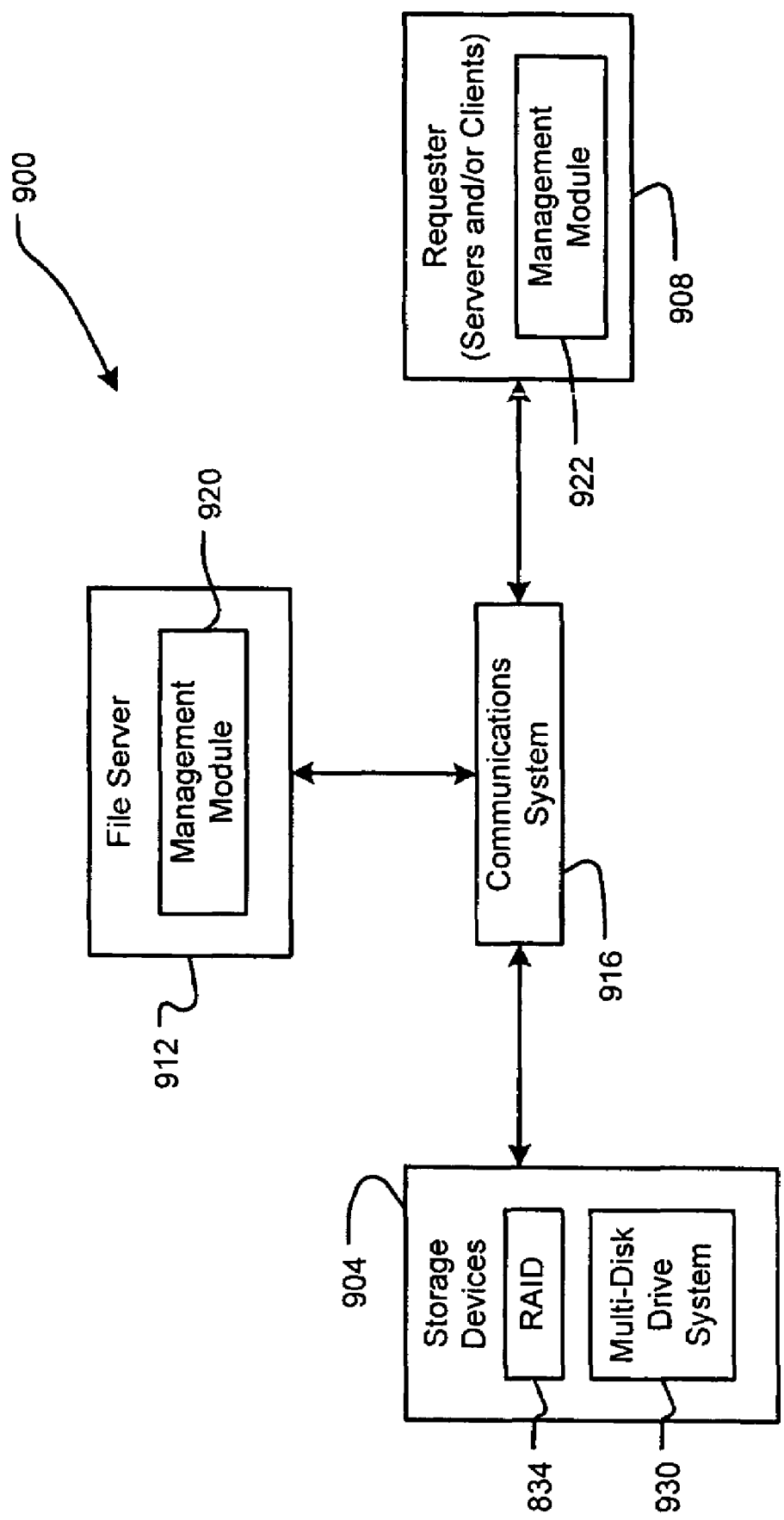
FIG. 26 is a functional block diagram of a network attachable storage (NAS) system according to the present invention that includes the RAID system of FIGS. 22A, 22B, 23A, 23B, 24A and/or 24B and/or a multi-drive system according to FIGS. 6-17.

Referring now to FIG. 26, a network attached storage (NAS) system 900 according to the present invention is shown to include storage devices 904, requesters 908, a file server 912, and a communications system 916. The storage devices 904 include the RAID system 834 and/or multi-disk drive systems 930 described above in FIGS. 6-19. The storage devices 904 typically may also include disc drives, RAID systems, tape drives, tape libraries, optical drives, jukeboxes, and/or any other storage devices to be shared as described above. As can be appreciated, using the improved RAID systems and/or multi-disk drive systems 930 will reduce the power consumption and data access times of the NAS system 900.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A disk drive system for a computer with high power and low power modes, comprising:
   a low power disk drive (LPDD);
   a high power disk drive (HPDD); and
   control module that includes a least used block (LUB) module that identifies a LUB in said LPDD, wherein said control module selectively transfers said LUB to said HPDD during said low power mode when at least one of a data storing request and a data retrieving request is received,
   wherein during said storing request for write data, said control module transfers said write data to said LPDD if sufficient space is available on said LPDD for said write data, and
   wherein said control module includes an adaptive storage module that determines whether said write data is likely to be used before said LUB when there is insufficient space available for said write data on said LPDD.

2. The disk drive system of claim 1 wherein if said write data is likely to be used after said LUB, said control module stores said write data on said HPDD.

3. The disk drive system of claim 1 wherein if said write data is likely to be used before said LUB, said control module powers said HPDD and transfers said LUB from said LPDD to said HPDD and then transfers said write data to said LPDD.

4. A disk drive system for a computer with high power and low power modes, comprising:
   a low power disk drive (LPDD);
   a high power disk drive (HPDD); and
   a control module that includes a least used block (LUB) module that identifies a LUB in said LPDD, wherein said control module selectively transfers said LUB to said HPDD during said low power mode when at least one of a data storing request and a data retrieving request is received,
   wherein during said data retrieving request for read data, said control module retrieves said read data from said LPDD if said read data is stored in said LPDD, and
   wherein said control module includes an adaptive storage module that determines whether said read data is likely to be used once when said read data is not located on said LPDD and wherein said control module retrieves said read data from said HPDD if said read data is likely to be used once.

5. The disk drive system of claim 4 wherein if said adaptive storage module determines that said read data is likely to be used more than once, said control module transfers said read data from said HPDD to said LPDD if sufficient space is available on said LPDD for said read data.

6. The disk drive system of claim 4 wherein if said adaptive storage module determines that said read data is likely to be used more than once, said control module transfers said LUB from said LPDD to said HPDD and said read data from said HPDD to said LPDD if sufficient space is not available on said LPDD for said read data.

7. A data storage system for a computer including low power and high power modes, comprising:
   low power (LP) nonvolatile memory;
   high power (HP) nonvolatile memory; and
   a cache control module that communicates with said LP and HP nonvolatile memory and that includes an adaptive storage module,
   wherein when write data is to be written to one of said LP and HP nonvolatile memory, said adaptive storage module generates an adaptive storage decision that selects one of said LP and HP nonvolatile memory, and
   wherein said adaptive decision is based on at least one of power modes associated with prior uses of said write data, a date of last use of said write data and a manual override status of said write data.

8. The data storage system of claim 7 wherein said LP nonvolatile memory includes at least one of flash memory and a low power disk drive (LPDD).

9. The data storage system of claim 8 wherein said LPDD includes one or more platters, wherein said one or more platters have a diameter that is less than or equal to 1.8".

10. The data storage system of claim 7 wherein said HP nonvolatile memory comprises a hard disk drive including one or more platters, wherein said one or more platters have a diameter that is greater than 1.8".

11. A data storage system for a computer including low power and high power modes, comprising:
    low power (LP) nonvolatile memory;
    high power (HP) nonvolatile memory; and
    a cache control module that communicates with said LP and HP nonvolatile memory and that includes a drive power reduction module,
    wherein when read data is read from said HP nonvolatile memory during said low power mode and said read data includes a sequential access data file, said drive power reduction module calculates a burst period for transfers of segments of said read data from said HP nonvolatile memory to LP nonvolatile memory.

12. The data storage system of claim 11 wherein said drive power reduction module selects said burst period to reduce power consumption during playback of said read data during said low power mode.

13. The data storage system of claim 11 wherein said LP nonvolatile memory includes at least one of flash memory and a low power disk drive (LPDD).

14. The data storage system of claim 13 wherein said LPDD includes one or more platters, wherein said one or more platters have a diameter that is less than or equal to 1.8".

15. The data storage system of claim 13 wherein said HP nonvolatile memory comprises a high power disk drive (HPDD).

16. The data storage system of claim 15 wherein said HPDD includes one or more platters, wherein said one or more platters have a diameter that is greater than 1.8".

17. The data storage system of claim 15 wherein said burst period is based on at least one of spin-up time of said LPDD, spin-up time of said HPDD, power consumption of said LPDD, power consumption of said HPDD, playback length of said read data, and capacity of said LPDD.

18. A multi-disk drive system, comprising:
   a high power disk drive (HPDD) including one or more platters, wherein said one or more platters have a diameter that is greater than 1.8";
   a low power disk drive (LPDD) including one or more platters, wherein said one or more platters have a diameter that is less than or equal to 1.8"; and
   a drive control module that at least one of selectively controls data access to and selectively controls data transfer between said LPDD and said HPDD independent of control signals from a host computer,
   wherein said drive control module and said host control module are implemented as a system on chip (SOC).

19. The multi-disk drive of claim 18 further comprising a host control module that provides an interface between said drive control module and the host computer.

20. The multi-disk drive of claim 19 wherein said drive control module includes:
   a hard drive controller (HDC) that communicates with said host control module;
   high power (HP) and low power (LP) spindle/voice coil motor (VCM) drivers that communicate with said HDC and said HPDD and said LPDD, respectively; and
   HP and LP read/write channel circuits that communicates with said HDC and said HPDD and said LPDD, respectively.

21. The multi-disk drive of claim 20 wherein said drive control module includes:
   a drive processor that communicates with said HDC; and
   a buffer that communicates with said HDC.

22. The multi-disk drive of claim 19 wherein said drive control module comprises:
   a high power control module including:
      a first hard drive controller (HDC) that communicates with said host control module;
      a first spindle/voice coil motor (VCM) driver that communicate with said first HDC and said HPDD; and
      a first read/write channel circuit that communicates with said first HDC and said HPDD.

23. The multi-disk drive of claim 22 wherein said high power control module is implemented by a system on chip (SOC).

24. The multi-disk drive of claim 22 wherein said high power drive control module includes:
   a first drive processor that communicates with said first HDC; and
   a first buffer that communicates with said first HDC.

25. The multi-disk drive of claim 19 wherein said drive control module comprises:
   a low power control module including:
   a second hard drive controller (HDC) that communicates with said host control module;
   a second spindle/voice coil motor (VCM) driver that communicates with said second HDC and said LPDD; and
   a second read/write channel circuit that communicates with said second HDC and said LPDD.

26. The multi-disk drive of claim 25 wherein said low power control module is implemented by a system on chip (SOC).

27. The multi-disk drive of claim 25 wherein said low power drive control module includes:
   a second drive processor that communicates with said second HDC; and
   a first buffer that communicates with said second HDC.

28. The multi-disk drive of claim 19 wherein said drive control module comprises:
   a first hard drive controller (HDC) that communicates with said host control module;
   a first spindle/voice coil motor (VCM) driver that communicate with said first HDC and said HPDD;
   a first read/write channel circuit that communicates with said first HDC and said HPDD; and
   a first interface that communicates with said LPDD.

29. The multi-disk drive of claim 28 wherein said HPDD further comprises:
   a first drive processor that communicates with said first HDC; and
   a first buffer that communicates with said first HDC.

30. The multi-disk drive of claim 28 wherein said LPDD comprises:
   a second interface that communicates with said first interface;
   a second hard drive controller (HDC) that communicates with said second interface;
   a second spindle/voice coil motor (VCM) driver that communicate with said second HDC; and
   a second read/write channel circuit that communicates with said second HDC.

31. The multi-disk drive of claim 30 wherein said LPDD further comprises:
   a second drive processor that communicates with said second HDC; and
   a second buffer that communicates with said second HDC.

32. The multi-disk drive of claim 18 further comprising an interface for directly connecting said LPDD to said drive control module.

33. The multi-disk drive of claim 32 wherein said interface is one of a Peripheral Component Interconnect (PCI) and PCI Express.

34. A data storage system for a computer including low power and high power modes, comprising:
   low power (LP) nonvolatile storing means for storing data;
   high power (HP) nonvolatile storing means for storing data; and
   cache control means that communicates with said LP and HP nonvolatile storing means and that includes adaptive storage means for generating an adaptive storage decision that selects one of said LP and HP nonvolatile storing means when write data is to be written to one of said LP and HP nonvolatile storing means,
wherein said adaptive decision is based on at least one of power modes associated with prior uses of said write data, a date of last use of said write data and a manual override status of said write data.

35. The data storage system of claim 34 wherein said LP nonvolatile storing means includes at least one of flash storing means for storing data and low power magnetic storing means for storing data.

36. The data storage system of claim 35 wherein said low power magnetic storing means includes one or more platters, wherein said one or more platters have a diameter that is less than or equal to 1.8".

37. The data storage system of claim 34 wherein said HP nonvolatile storing means comprises a hard magnetic storing means including one or more platters, wherein said one or more platters have a diameter that is greater than 1.8".

38. A data storage system for a computer including low power and high power modes, comprising:
    low power (LP) nonvolatile storing means for storing data;
    high power (HP) nonvolatile storing means for storing data; and
    cache control means for controlling data storage and that communicates with said LP and HP nonvolatile storing means and that includes drive power reduction means for calculating a burst period for transfers of segments of said read data from said HP nonvolatile storing means to LP nonvolatile storing means when read data is read from said HP nonvolatile storing means during said low power mode and said read data includes a sequential access data file.

39. The data storage system of claim 38 wherein said drive power reduction means selects said burst period to reduce power consumption during playback of said read data during said low power mode.

40. The data storage system of claim 38 wherein said LP nonvolatile storing means includes at least one of flash storing means and a low power magnetic storing means.

41. The data storage system of claim 40 wherein said low power magnetic storing means includes one or more platters, wherein said one or more platters have a diameter that is less than or equal to 1.8".

42. The data storage system of claim 40 wherein said HP nonvolatile storing means comprises a high power disk drive.

43. The data storage system of claim 42 wherein said high power disk drive includes one or more platters, wherein said one or more platters have a diameter that is greater than 1.8".

44. The data storage system of claim 42 wherein said burst period is based on at least one of spin-up time of said low power magnetic storing means, spin-up time of said high power magnetic storing means, power consumption of said low power magnetic storing means, power consumption of said high power magnetic storing means, playback length of said read data, and capacity of said low power magnetic storing means.

45. A multi-disk drive system for a host computer, comprising:
    high power magnetic storing means for storing data and including one or more platters, wherein said one or more platters have a diameter that is greater than 1.8";
    low power magnetic storing means for storing data and including one or more platters, wherein said one or more platters have a diameter that is less than or equal to 1.8"; and
    drive control means for at least one of selectively controlling data access to and selectively controls data transfer between said low power magnetic storing means and said high power magnetic storing means independent of control signals from the host computer,
    wherein said drive control means and said host control means are implemented as a system on chip (SOC).

46. The multi-disk drive system of claim 45 further comprising host control means that provides an interface between said drive control means and the host computer.

47. The multi-disk drive system of claim 46 wherein said drive control means includes:
    hard drive control (HDC) means for controlling at least one of said high power and low power magnetic storing means and that communicates with said host control means;
    high power (HP) and low power (LP) driving means for driving a spindle and a voice coil motor (VCM) and that communicate with said hard drive control means and said high power magnetic storing means and said low power magnetic storing means, respectively; and
    HP and LP read/write means for encoding and decoding data and that communicate with said HDC means and said high power magnetic storing means and said low power magnetic storing means, respectively.

48. The multi-disk drive system of claim 47 wherein said drive control means includes:
    drive processing means for processing data and that communicates with said HDC means; and
    buffering means for buffering data and that communicates with said HDC means.

49. The multi-disk drive system of claim 46 wherein said drive control means comprises:
    high power control means for controlling access to said high power magnetic storing means and including:
        first hard drive control (HDC) means for controlling said high power magnetic storing means and that communicates with said host control means;
        first driving means for driving a first spindle/voice coil motor (VCM) and that communicate with said first HDC means and said high power magnetic storing means; and
        first read/write channel means for encoding and decoding data and that communicates with said first HDC and said high power magnetic storing means.

50. The multi-disk drive system of claim 49 wherein said high power control means is implemented by a system on chip (SOC).

51. The multi-disk drive system of claim 49 wherein said high power drive control means includes:
    first drive processing means for processing data and that communicates with said first HDC means; and
    first buffering means for buffering and that communicates with said first HDC means.

52. The multi-disk drive system of claim 46 wherein said drive control means comprises:
    low power control means for controlling access to low power nonvolatile memory and including:
        second hard drive control (HDC) means for controlling said low power magnetic storing means and that communicates with said host control means;
        second driving means for driving a spindle/voice coil motor (VCM) and that communicates with said second HDC means and said low power magnetic storing means; and
        second read/write means for encoding and decoding data and that communicates with said second HDC means and said low power magnetic storing means.

53. The multi-disk drive system of claim 52 wherein said low power control means is implemented by a system on chip (SOC).

54. The multi-disk drive system of claim 52 wherein said low power drive control means includes:
second drive processing means for processing data and that communicates with said second HDC means; and
first buffering means for buffering data and that communicates with said second HDC means.

55. The multi-disk drive system of claim 46 wherein said drive control means comprises:
first hard drive control (HDC) means for controlling said high power magnetic storing means and that communicates with said host control means;
first driving means for driving a spindle/voice coil motor (VCM) and that communicate with said first HDC means and said high power magnetic storing means;
first read/write means for encoding and decoding data and that communicates with said first HDC means and said high power magnetic storing means; and
first interface means for providing an interface to said low power magnetic storing means.

56. The multi-disk drive system of claim 55 wherein said high power magnetic storing means further comprises:
first drive processing means for processing data and that communicates with said first HDC means; and
first buffering means for buffering data and that communicates with said first HDC means.

57. The multi-disk drive system of claim 55 wherein said low power magnetic storing means comprises:
second interface means for communicating with said first interface means;
second hard drive control (HDC) means for controlling said low power magnetic storing means and that communicates with said second interface means;
second driving means for driving a second spindle/voice coil motor (VCM) driver and that communicates with said second HDC means; and
second read/write means for encoding and decoding data and that communicates with said second HDC means.

58. The multi-disk drive system of claim 57 wherein said low power magnetic storing means further comprises:
second drive processing means for processing data and that communicates with said second HDC means; and
second buffering means for buffering data and that communicates with said second HDC means.

59. The multi-disk drive system of claim 45 further comprising interface means for directly connecting said low power magnetic storing means to said drive control means.

60. The multi-disk drive system of claim 59 wherein said interface means is one of a Peripheral Component interconnect (PCI) and PCI Express.

61. A method for storing data in a computer in high power and low power modes, comprising:
identifying a least used block (LUB) in a low power disk drive LPDD;
selectively transferring said LUB to a high power disk drive (HPDD) during said low power mode when at least one of a data storing request and a data retrieving request is received;
transferring write data to said LPDD if sufficient space is available on said LPDD for said write data during said storing request for said write data; and
determining whether said write data is likely to be used before said LUB when there is insufficient space available for said write data on said LPDD.

62. The method of claim 61 further comprising storing said write data on said HPDD if said write data is likely to be used after said LUB.

63. The method of claim 61 further comprising powering said HPDD and transferring said LUB from said LPDD to said HPDD and then transferring said write data to said LPDD if said write data is likely to be used before said LUB.

64. A method for storing data in a computer in high power and low power modes, comprising:
identifying a least used block (LUB) in a low power disk drive LPDD;
selectively transferring said LUB to a high power disk drive (HPDD) during said low power mode when at least one of a data storing request and a data retrieving request is received;
retrieving read data from said LPDD if said read data is stored in said LPDD during said data retrieving request for said read data;
determining whether said read data is likely to be used once when said read data is not located on said LPDD; and
retrieving said read data from said HPDD if said read data is likely to be used once.

65. The method of claim 64 further comprising transferring said read data from said HPDD to said LPDD if sufficient space is available on said LPDD for said read data when said read data is likely to be used more than once.

66. The method of claim 64 further comprising transferring said LUB from said LPDD to said HPDD and said read data from said HPDD to said LPDD if sufficient space is not available on said LPDD for said read data when said read data is likely to be used more than once.

67. A data storage system for a computer including low power and high power modes, comprising:
low power (LP) nonvolatile storing means for storing data;
high power (HP) nonvolatile storing means for storing data; and
operating system means for communicating with said LP and HP nonvolatile storing means and that includes drive power reduction means for calculating a burst period for transfers of segments of said read data from said HP nonvolatile storing means to LP nonvolatile storing means when read data Is read from said HP nonvolatile storing means during said low power mode and said read data includes a sequential access data file.

68. The data storage system of claim 67 wherein said drive power reduction means selects said burst period to reduce power consumption during playback of said read data during said low power mode.

69. The data storage system of claim 67 wherein said LP nonvolatile storing means includes at least one of flash storing means and a low power magnetic storing means.

70. The data storage system of claim 69 wherein said low power magnetic storing means includes one or more platters, wherein said one or more platters have a diameter that is less than or equal to 1.8".

71. The data storage system of claim 69 wherein said HP nonvolatile storing means comprises a high power disk drive.

72. The data storage system of claim 71 wherein said high power disk drive includes one or more platters, wherein said one or more platters have a diameter that is greater than 1.8".

73. The data storage system of claim 71 wherein said burst period is based on at least one of spin-up time of said low power magnetic storing means, spin-up time of said high power magnetic storing means, power consumption of said low power magnetic storing means, power consumption of said high power magnetic storing means, playback length of said read data, and capacity of said low power magnetic storing means.

74. A data storage system for a computer including low power and high power modes, comprising:
  low power (LP) nonvolatile storing means for storing data;
  high power (HP) nonvolatile storing means for storing data; and
  host control means for communicating with said LP and HP nonvolatile storing means and that includes drive power reduction means for calculating a burst period for transfers of segments of said read data from said HP nonvolatile storing means to LP nonvolatile storing means when read data is read from said HP nonvolatile storing means during said low power mode and said read data includes a sequential access data file.

75. The data storage system of claim 74 wherein said drive power reduction means selects said burst period to reduce power consumption during playback of said read data during said low power mode.

76. The data storage system of claim 74 wherein said LP nonvolatile storing means includes at least one of flash storing means and a low power magnetic storing means.

77. The data storage system of claim 76 wherein said low power magnetic storing means includes one or more platters, wherein said one or more platters have a diameter that is less than or equal to 1.8".

78. The data storage system of claim 76 wherein said HP nonvolatile storing means comprises a high power disk drive.

79. The data storage system of claim 78 wherein said high power disk drive includes one or more platters, wherein said one or more platters have a diameter that is greater than 1.8".

80. The data storage system of claim 78 wherein said burst period is based on at least one of spin-up time of said low power magnetic storing means, spin-up time of said high power magnetic storing means, power consumption of said low power magnetic storing means, power consumption of said high power magnetic storing means, playback length of said read data, and capacity of said low power magnetic storing means.

81. A redundant array of independent disks (RAID) system, comprising:
  a first disk array that includes X high power disk drives (HPDD), wherein X is greater than or equal to 2;
  a second disk array that includes Y low power disk drives (LPDD), wherein Y is greater than or equal to 1;
  an array management module that communicates with said first and second disk arrays and that utilizes said second disk array to cache data to and/or from said first disk array,
  wherein when read data is read from said first HPDD and said read data includes a sequential access data file, said array management module calculates a burst period for transfers of segments of said read data from said first HPDD to a first LPDD.

82. The RAID system of claim 81 wherein said HPDD includes one or more platters, wherein said one or more platters have a diameter that is greater than 1.8".

83. The RAID system of claim 81 wherein said LPDD includes one or more platters, wherein said one or more platters have a diameter that is less than or equal to 1.8".

84. The RAID system of claim 81 wherein said first and second disk arrays communicate directly with said array management module.

85. The RAID system of claim 81 wherein said first disk array communicates with said array management module and said second disk array communicates with said first disk array.

86. The RAID system of claim 85 further comprising a bypass path around said first disk array, wherein said array management module selectively bypasses data around said first disk array to said second disk array.

87. The RAID system of claim 81 wherein said second disk array communicates with said array management module and said first disk array communicates with said second disk array.

88. The RAID system of claim 87 further comprising a bypass path around said second disk array, wherein said array management module selectively bypasses data around said second disk array to said first disk array.

89. The RAID system of claim 87 wherein said array management module includes a least used block (LUB) module that identifies a LUB in a first LPDD, wherein said array management module selectively transfers said LUB to a first HPDD during said low power mode when at least one of a data storing request and a data retrieving request is received.

90. The RAID system of claim 89 wherein during said data retrieving request for read data, said array management module retrieves said read data from said first LPDD if said read data is stored in said first LPDD.

91. The RAID system of claim 90 wherein said array management module includes an adaptive storage module that determines whether said read data is likely to be used once when said read data is not located on said first LPDD and wherein said array management module retrieves said read data from said first HPDD if said read data is likely to be used once.

92. The RAID system of claim 91 wherein if said adaptive storage module determines that said read data is likely to be used more than once, said array management module transfers said read data from said first HPDD to said first LPDD if sufficient space is available on said first LPDD for said read data.

93. The RAID system of claim 91 wherein if said adaptive storage module determines that said read data is likely to be used more than once, said array management module transfers said LUB from said first LPDD to said first HPDD and said read data from said first HPDD to said first LPDD if sufficient space is not available on said first LPDD for said read data.

94. The RAID system of claim 90 wherein said array management module transfers said read data from said first HPDD to said first LPDD if sufficient space is available on said first LPDD for said read data.

95. The RAID system of claim 90 wherein said array management module transfers said LUB from said first LPDD to said first HPDD and said read data from said first HPDD to said first LPDD if sufficient space is not available on said first LPDD for said read data.

96. The RAID system of claim 90 wherein if said read data is not located on said first LPDD, said array management module retrieves said read data from said first HPDD.

97. The RAID system of claim 81 wherein X=Y.

98. The RAID system of claim 81 wherein said array management module maintains power to said second disk array during operation and selectively operates said first disk array in an off mode during operation.

99. The RAID system of claim 81 wherein during said storing request for write data, said array management module transfers said write data to said first LPDD if sufficient space is available on said first LPDD for said write data.

100. The RAID system of claim 99 wherein if there is insufficient space available for said write data on said first LPDD, said array management module powers said first HPDD and transfers said at least one said LUB from said first LPDD to said first HPDD and transfers said write data to said first LPDD.

101. The RAID system of claim 99 wherein said array management module includes an adaptive storage module that determines whether said write data is likely to be used before said LUB when there is insufficient space available for said write data on said first LPDD.

102. The RAID system of claim 101 wherein if said write data is likely to be used after said LUB, said array management module stores said write data on said first HPDD.

103. The RAID system of claim 101 wherein if said write data is likely to be used before said LUB, said array management module powers said first HPDD and transfers said LUB from said first LPDD to said first HPDD and then transfers said write data to said first LPDD.

104. The RAID system of claim 81 wherein during a storing request for write data, said array management module determines whether there is sufficient space available on a first LPDD for said write data and transfers said write data to said first LPDD if sufficient space is available.

105. The RAID system of claim 104 wherein said array management module stores said write data on a first HPDD if insufficient space is available.

106. The RAID system of claim 104 wherein said array management module further includes a LPDD maintenance module that periodically transfers data files from said first LPDD to said first HPDD to increase available disk space on said first LPDD.

107. The RAID system of claim 106 wherein said LPDD maintenance module transfers said data files based on at least one of age, size and likelihood of future use.

108. The RAID system of claim 81 wherein said array management module selects said burst period to reduce power consumption.

109. The RAID system of claim 81 wherein said burst period is based on at least one of spin-up time of said first LPDD, spin-up time of said first HPDD, power consumption of said first LPDD, power consumption of said first HPDD, playback length of said read data, and/or a capacity of said first LPDD.

110. A Network Attached Storage (NAS) system comprising the RAID system of claim 81.

111. A redundant array of independent disks (RAID) system, comprising:
first array means for storing data that includes X high power magnetic storing means for storing data, wherein X is greater than or equal to 2;
second array means for storing data that includes Y low power magnetic storing means, wherein Y is greater than or equal to 1;
array management means for communicating with said first and second array means and for utilizing said second array means to cache data to and/or from said first array means,
wherein when read data is read from said first high power magnetic storing means and said read data includes a sequential access data file, said array management means calculates a burst period for transfers of segments of said read data from said first high power magnetic storing means to a first low power magnetic storing means.

112. The RAID system of claim 111 wherein said high power magnetic storing means includes one or more platters, wherein said one or more platters have a diameter that is greater than 1.8".

113. The RAID system of claim 111 wherein said low power magnetic storing means includes one or more platters, wherein said one or more platters have a diameter that is less than or equal to 1.8".

114. The RAID system of claim 111 wherein said first and second array means communicate directly with said array management means.

115. The RAID system of claim 111 wherein said first array means communicates with said array management means and said second array means communicates with said first array means.

116. The RAID system of claim 115 further comprising bypass means for selectively bypassing data around said first array means to said second array means.

117. The RAID system of claim 111 wherein said second array means communicates with said array management means and said first array means communicates with said second array means.

118. The RAID system of claim 117 further comprising bypass means for selectively bypassing data around said second array means to said first array means.

119. The RAID system of claim 117 wherein said array management means includes least used block (LUB) means for identifying a LUB in a first low power magnetic storing means, wherein said array management means selectively transfers said LUB to a first high power magnetic storing means during said low power mode when at least one of a data storing request and a data retrieving request is received.

120. The RAID system of claim 119 wherein during said data retrieving request for read data, said array management means retrieves said read data from said first low power magnetic storing means if said read data is stored in said first low power magnetic storing means.

121. The RAID system of claim 120 wherein said array management means includes adaptive storage means for determining whether said read data is likely to be used once when said read data is not located on said first low power magnetic storing means and wherein said array management means retrieves said read data from said first high power magnetic storing means if said read data is likely to be used once.

122. The RAID system of claim 121 wherein if said adaptive storage means determines that said read data is likely to be used more than once, said array management means transfers said read data from said first high power magnetic storing means to said first low power magnetic storing means if sufficient space is available on said first low power magnetic storing means for said read data.

123. The RAID system of claim 121 wherein if said adaptive storage means determines that said read data is likely to be used more than once, said array management means transfers said LUB from said first low power magnetic storing means to said first high power magnetic storing means and said read data from said first high power magnetic storing means to said first low power magnetic storing means if sufficient space is not available on said first low power magnetic storing means for said read data.

124. The RAID system of claim 120 wherein said array management means transfers said read data from said first high power magnetic storing means to said first low power magnetic storing means if sufficient space is available on said first low power magnetic storing means for said read data.

125. The RAID system of claim 120 wherein said array management means transfers said LUB from said first low power magnetic storing means to said first high power magnetic storing means and said read data from said first high power magnetic storing means to said first low power magnetic storing means if sufficient space is not available on said first low power magnetic storing means for said read data.

126. The RAID system of claim 120 wherein if said read data is not located on said first tow power magnetic storing means, said array management means retrieves said read data from said first high power magnetic storing means.

127. The RAID system of claim 111 wherein X=Y.

128. The RAID system of claim 111 wherein said array management means maintains power to said second array means during operation and selectively operates said first array means in an off mode during operation.

129. The RAID system of claim 111 wherein during said storing request for write data, said array management means transfers said write data to said first low power magnetic storing means if sufficient space is available on said first low power magnetic storing means for said write data.

130. The RAID system of claim 129 wherein if there is insufficient space available for said write data on said first low power magnetic storing means, said array management means powers said first high power magnetic storing means and transfers said at least one said LUB from said first low power magnetic storing means to said first high power magnetic storing means and transfers said write data to said first low power magnetic storing means.

131. The RAID system of claim 129 wherein said array management means includes adaptive storage means for determining whether said write data is likely to be used before said LUB when there is insufficient space available for said write data on said first low power magnetic storing means.

132. The RAID system of claim 131 wherein if said write data is likely to be used after said LUB, said array management means stores said write data on said first high power magnetic storing means.

133. The RAID system of claim 131 wherein if said write data is likely to be used before said LUB, said array management means powers said first high power magnetic storing means and transfers said LUB from said first low power magnetic storing means to said first high power magnetic storing means and then transfers said write data to said first low power magnetic storing means.

134. The RAID system of claim 111 wherein during a storing request for write data, said array management means determines whether there is sufficient space available on a first low power magnetic storing means for said write data and transfers said write data to said first low power magnetic storing means if sufficient space is available.

135. The RAID system of claim 134 wherein said array management means stores said write data on a first high power magnetic storing means if insufficient space is available.

136. The RAID system of claim 134 wherein said array management means further includes maintenance means for periodically transferring data files from said first low power magnetic storing means to said first high power magnetic storing means to increase available disk space on said first low power magnetic storing means.

137. The RAID system of claim 136 wherein said maintenance means transfers said data files based on at least one of age, size and likelihood of future use.

138. The RAID system of claim 111 wherein said array management means selects said burst period to reduce power consumption.

139. The RAID system of claim 111 wherein said burst period is based on at least one of spin-up time of said first tow power magnetic storing means, spin-up time of said first high power magnetic storing means, power consumption of said first low power magnetic storing means, power consumption of said first high power magnetic storing means, playback length of said read data, and/or a capacity of said first low power magnetic storing means.

140. A Network Attached Storage (NAS) system comprising the RAID system of claim 111.

141. A method for operating a redundant array of independent disks (RAID) system, comprising:
providing a first disk array that includes X high power disk drives (HPDD), wherein X is greater than or equal to 2;
providing a second disk array that includes Y low power disk drives (LPDD), wherein Y is greater than or equal to 1;
utilizing said second disk array to cache data to and/or from said first disk array, and
calculating a burst period for transfers of segments of said read data from said first HPDD to a first LPDD when read data is read from said first HPDD and said read data includes a sequential access data file.

142. The method of claim 141 wherein said HPDD includes one or more platters, wherein said one or more platters have a diameter that is greater than 1.8".

143. The method of claim 141 wherein said LPDD includes one or more platters, wherein said one or more platters have a diameter that is less than or equal to 1.8".

144. The method of claim 141 wherein said first and second disk arrays communicate directly with an array management module.

145. The method of claim 141 wherein said first disk array communicates with an array management module and said second disk array communicates with said first disk array.

146. The method of claim 145 further comprising selectively bypassing said first disk array.

147. The method of claim 141 wherein said second disk array communicates with said array management module and said first disk array communicates with said second disk array.

148. The method of claim 147 further comprising selectively bypassing said second disk array.

149. The method of claim 147 further comprising:
identifying a LUB in a first LPDD;
selectively transferring said LUB to a first HPDD during said low power mode when at least one of a data storing request and a data retrieving request is received.

150. The method of claim 149 further comprising retrieving said read data from said first LPDD if said read data is stored in said first LPDD during said data retrieving request for read data.

151. The method of claim 150 further comprising:
determining whether said read data is likely to be used once when said read data is not located on said first LPDD; and
retrieving said read data from said first HPDD if said read data is likely to be used once.

152. The method of claim 151 further comprising transferring said read data from said first HPDD to said first LPDD if sufficient space is available on said first LPDD for said read data and said read data is likely to be used more than once.

153. The method of claim 151 further comprising transferring said LUB from said first LPDD to said first HPDD and said read data from said first HPDD to said first LPDD if sufficient space is not available on said first LPDD for said read data and said read data is likely to be used more than once.

154. The method of claim 150 further comprising transferring said read data from said first HPDD to said first LPDD if sufficient space is available on said first LPDD for said read data.

155. The method of claim 150 further comprising transferring said LUB from said first LPDD to said first HPDD and said read data from said first HPDD to said first LPDD if sufficient space is not available on said first LPDD for said read data.

156. The method of claim 150 further comprising retrieving said read data from said first HPDD if said read data is not located on said first LPDD.

157. The method of claim 141 wherein X=Y.

158. The method of claim 141 further comprising:
maintaining power to said second disk array during operation; and
selectively operating said first disk array in an off mode during operation.

159. The method of claim 141 further comprising transferring said write data to said first LPDD if sufficient space is available on said first LPDD for said write data during said storing request for write data.

160. The method of claim 159 further comprising:
powering said first HPDD; and
transferring said at least one said LUB from said first LPDD to said first HPDD and said write data to said first LPDD if there is insufficient space available for said write data on said first LPDD.

161. The method of claim 159 further comprising determining whether said write data is likely to be used before said LUB when there is insufficient space available for said write data on said first LPDD.

162. The method of claim 161 further comprising storing said write data on said first HPDD if said write data is likely to be used after said LUB.

163. The method of claim 161 further comprising:
powering said first HPDD; and
transferring said LUB from said first LPDD to said first HPDD and said write data to said first LPDD if said write data is likely to be used before said LUB.

164. The method of claim 141 further comprising determining whether there is sufficient space available on a first LPDD for said write data and transferring said write data to said first LPDD if sufficient space is available during a storing request for write data.

165. The method of claim 164 further comprising storing said write data on a first HPDD if insufficient space is available.

166. The method of claim 164 further comprising periodically transferring data files from said first LPDD to said first HPDD to increase available disk space on said first LPDD.

167. The method of claim 166 further comprising transferring said data files based on at least one of age, size and likelihood of future use.

168. The method of claim 141 further comprising selecting said burst period to reduce power consumption.

169. The method of claim 141 wherein said burst period is based on at least one of spin-up time of said first LPDD, spin-up time of said first HPDD, power consumption of said first LPDD, power consumption of said first HPDD, playback length of said read data, and/or a capacity of said first LPDD.

* * * * *